United States Patent [19]
Adler

[11] Patent Number: 5,261,035
[45] Date of Patent: Nov. 9, 1993

[54] NEURAL NETWORK ARCHITECTURE BASED ON SUMMATION OF PHASE-COHERENT ALTERNATING CURRENT SIGNALS

[75] Inventor: Stephen L. Adler, Princeton, N.J.

[73] Assignee: Institute of Advanced Study, Princeton, N.J.

[21] Appl. No.: 708,489

[22] Filed: May 31, 1991

[51] Int. Cl.$^5$ .......................... G06F 15/18; G06G 7/00
[52] U.S. Cl. ........................................... 395/24; 395/2; 364/807
[58] Field of Search ...................... 395/24.2; 364/807

[56] References Cited

U.S. PATENT DOCUMENTS

| | | | |
|---|---|---|---|
| 3,287,649 | 11/1966 | Rosenblatt | 395/24 |
| 4,660,166 | 4/1987 | Hopfield | 395/24 |
| 4,719,591 | 1/1988 | Hopfield et al. | 364/807 |
| 4,731,747 | 3/1988 | Denker | 395/24 |
| 4,782,460 | 11/1988 | Spencer | 395/24 |
| 4,839,700 | 6/1989 | Ramesham et al. | 361/500 |
| 4,942,367 | 7/1990 | Milkovic | 395/24 |
| 4,959,532 | 9/1990 | Owechko | 395/24 |
| 5,063,417 | 11/1991 | Hopfield | 395/25 |
| 5,063,601 | 11/1991 | Hayduic | 395/24 |
| 5,107,442 | 4/1992 | Weideman | 395/24 |
| 5,115,492 | 5/1992 | Engeler | 395/24 |
| 5,124,918 | 6/1992 | Beer et al. | 395/21 |

OTHER PUBLICATIONS

"Simple 'Neural' Optimization Network" Tauic et al., Trans. on Cir. and systems, IEEE 1986.
"Neural computing" Wasserman et al., Apr. 1989.

(List continued on next page.)

*Primary Examiner*—Allen R. MacDonald
*Assistant Examiner*—George Davis
*Attorney, Agent, or Firm*—Antonelli, Terry, Stout & Kraus

[57] ABSTRACT

A neural network architecture has phase-coherent alternating current neural input signals. Each input $v_k^{in}$ is a two-phase pair of signals 180 degrees out of phase. Capacitive coupling of both signals of n input pairs to a summation line gives a non-dissipative realization of the weighted sum $$\sum_{k=1}^{n} w_{ik} v_k^{in},$$

with general real neural weights $w_{ik}$. An alternating current offset signal proportional to $u_i$ is also capacitively coupled to the summation line. The signal on the summation line is passed through a low input capacitance follower/amplifier, a rectifier and a filter, producing a direct current signal proportional to the magnitude $$\left| \sum_{k=1}^{n} w_{ik} v_k^{in} + u_i \right|.$$

This signal is compared with a direct current threshold proportional to $t_i$, and the resultant is used to gate a two-phase alternating current output signal. The output is therefore functionally related to the inputs by $$v_i^{out} = \theta \left( \left| \sum_{k=1}^{n} w_{ik} v_k^{in} + u_i \right| - t_i \right),$$

with $\theta$ the Heaviside step function. This generalized neuron can directly compute the "Exclusive Or" (XOR) logical operation. Alternative forms of the alternating current neuron using phase-shifters permit complex number inputs, outputs and neural weightings.

32 Claims, 8 Drawing Sheets

OTHER PUBLICATIONS

A Purely Capacitive Synaptic Matrix for Fixed-Weight Neural Networks by Ugur Cilingiroglu, IEEE Transactions on Circuits and Systems, vol. 38, No. 2, Feb. 1991.

Speech Recognition Network with SC Neuron-Like Components by Horio, et al., Dept. of Electronic Eng., Tokyo Denki Univ., 1988 IEEE.

Discrete-State Phasor Neural Networks by Andre J. Noest, Physical Review A, vol. 38, No. 4, Aug. 15, 1988.

Adaptive Optical Networks Using Photorefractive Crystals by Psaltis, et al., Applied Optics, vol. 27, Aug. 15, 1988.

Adaptive Optical Networks Using Photorefractive Crystals by Psaltis, et al., Applied Optics, vol. 27, No. 9, May 1, 1988.

Neural Computing, Theory and Practice by Philip D. Wasserman, Anza Research, Inc., May 1, 1990.

Introduction to the Theory of Neural Computation by Hertz, et al., Santa Fe Institute.

Switched-Capacitor Neural Networks by Tsividis, et al., Jul. 8, 1987 Electronics Letters Aug. 27, 1987, vol. 23, No. 18.

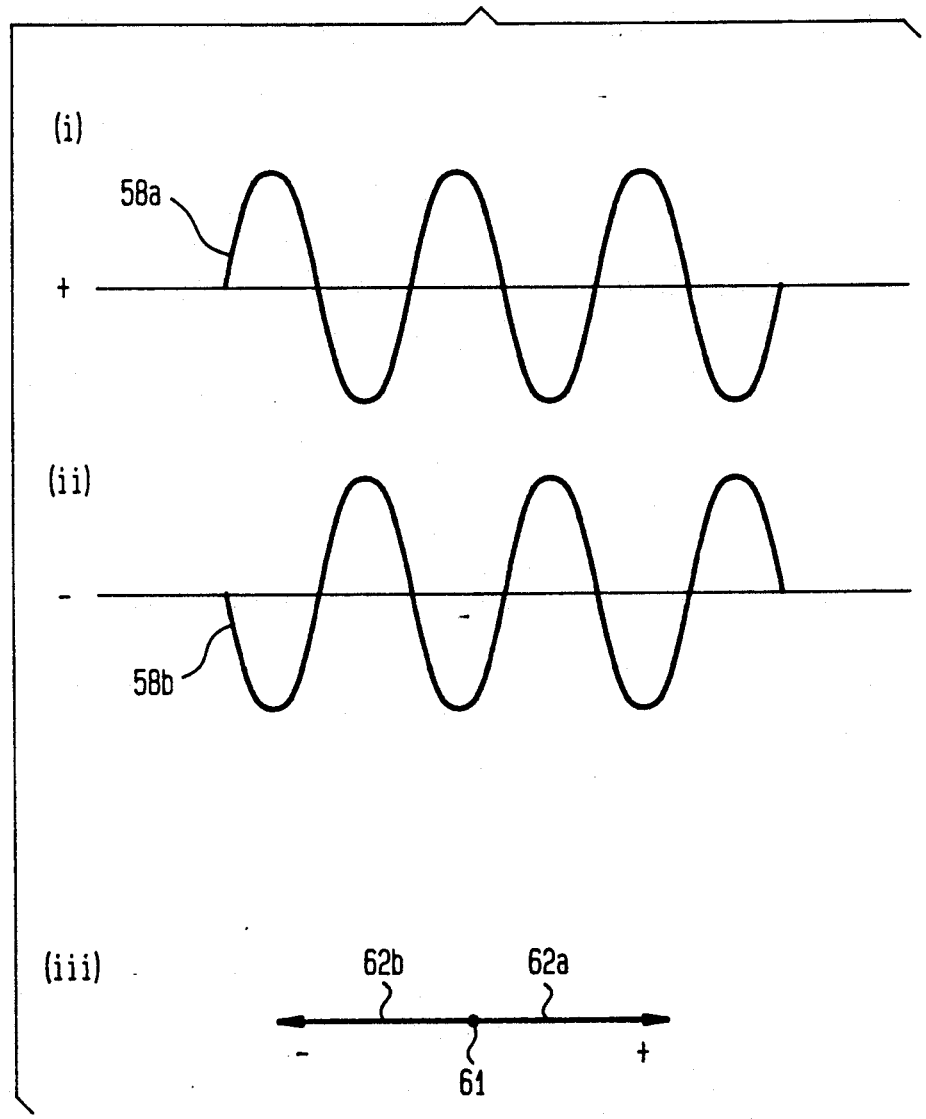

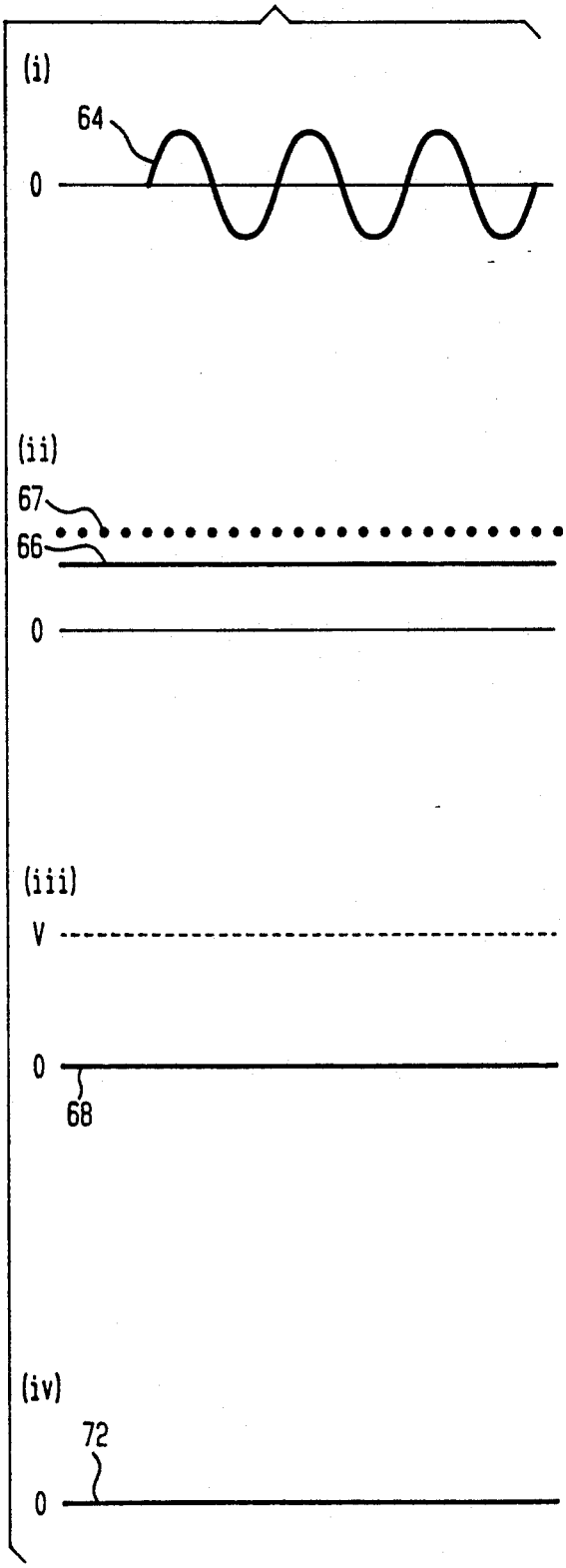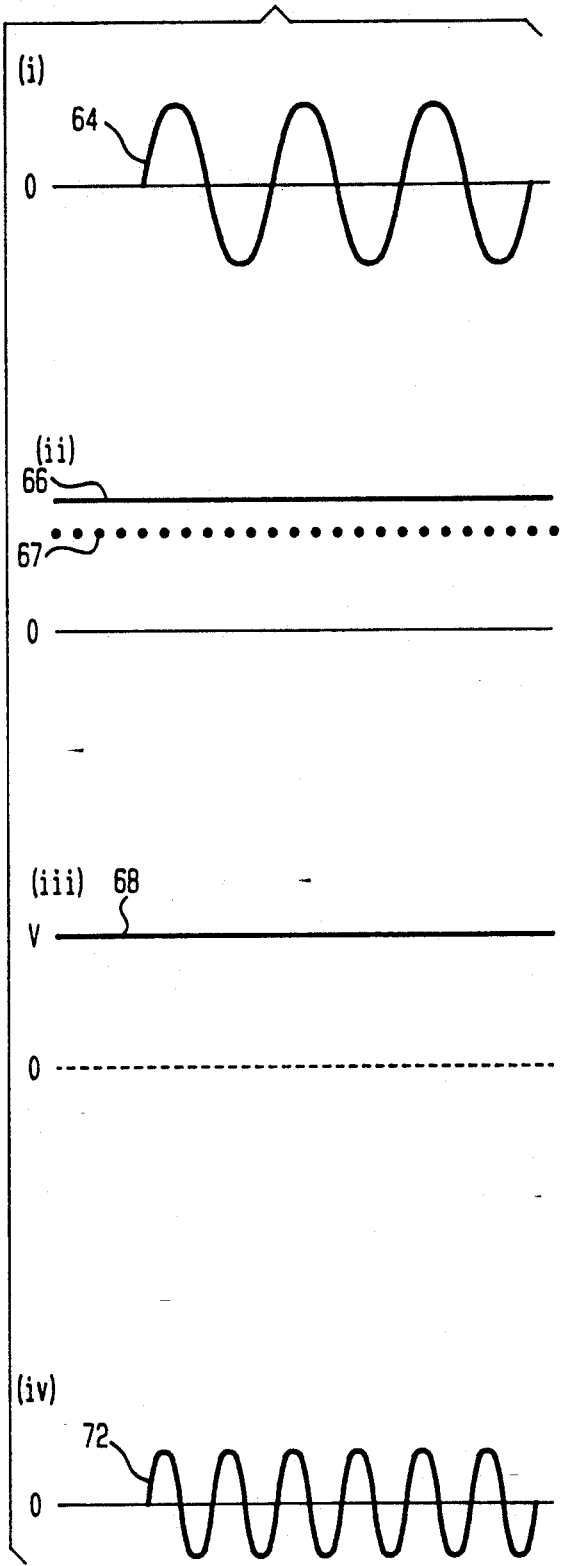

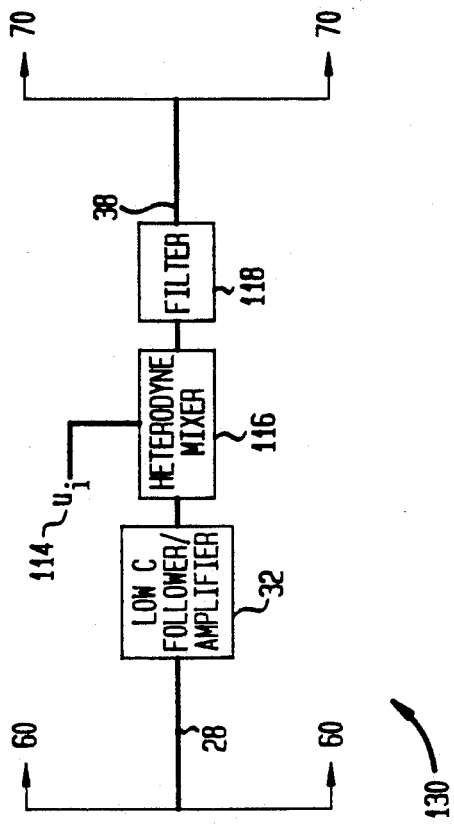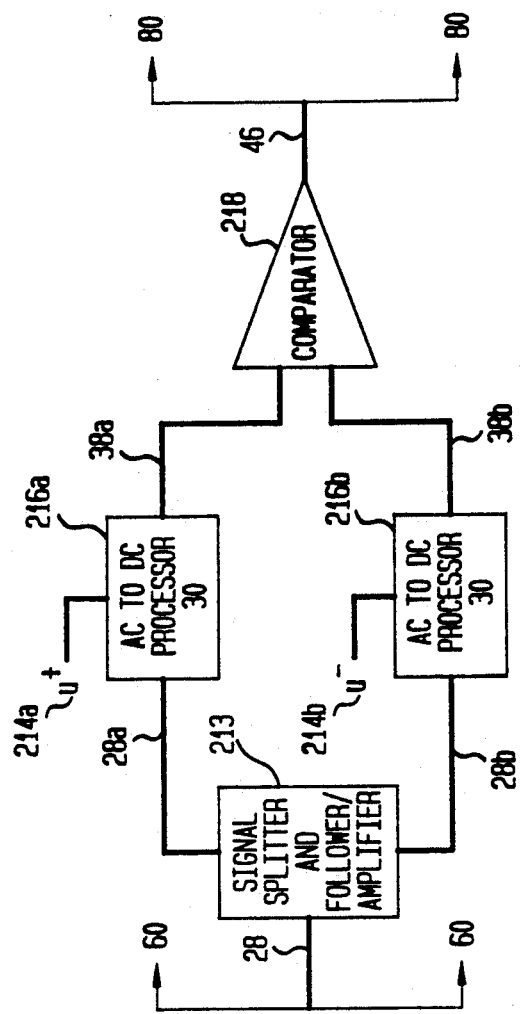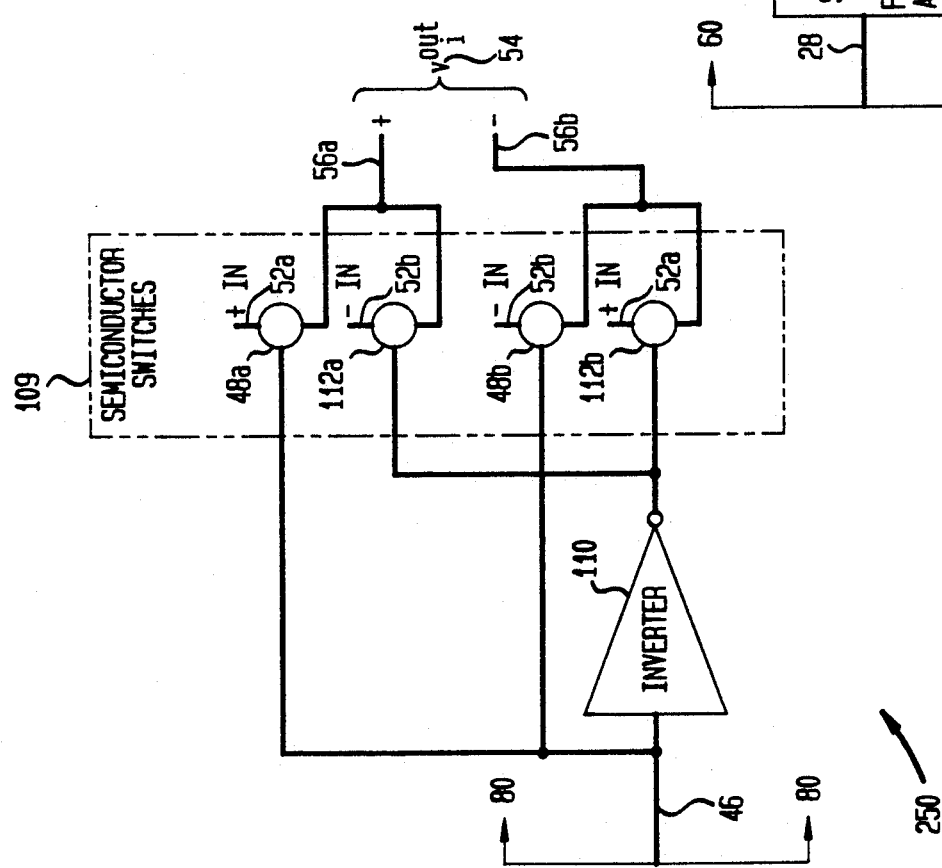

NEURAL NETWORK ARCHITECTURE BASED ON SUMMATION OF PHASE-COHERENT ALTERNATING CURRENT SIGNALS

BACKGROUND OF THE INVENTION

1. Field of the Invention

This invention relates to a neural network architecture having phase-coherent alternating current neuron input signals, that are combined by capacitive coupling to give a weighted sum signal, which is then rectified and further non-linearly processed to yield the neuron output.

2. Description of the Related Art

Electrical networks and optical analogs having neuron-like properties have been widely studied in recent years, with the aim of solving problems such as pattern recognition, associative memory, and combinatorial optimization, which are difficult to deal with by conventional computational approaches. Extensive theoretical work on neural networks has also been pursued, and good summaries of the current status of the subject can be found in the recent books: Wasserman, P. D., *Neural Computing, Theory and Practice*, Van Nostrand Reinhold, 1989, and Hertz, J., Krogh, A., and Palmer, R. G., *Introduction to the Theory of Neural Computation*, Addison-Wesley, 1991. The basic computational element, or neuron, in the prior art described in these references is the Mc Culloch-Pitts neuron, represented by the equation $$v_i^{out} = \theta \left( \sum_{k=1}^{n} w_{ik} v_k^{in} - t_i \right), \tag{1}$$

in which $v_k^{in}$ and $v_i^{out}$ are respectively inputs and outputs which take the values 0 or 1, $w_{ik}$ and $t_i$ are respectively weights and a threshold which can take any real number values, and $\theta$ is the Heaviside step function defined by $$\theta(x) = \begin{cases} 1 & x \geq 0 \\ 0 & x < 0. \end{cases} \tag{2}$$

In some applications, the neuron is alternatively defined by $$v_i^{out} = \epsilon \left( \sum_{k=1}^{n} w_{ik} v_k^{in} - t_i \right), \tag{3}$$

with the inputs and outputs now taking the values $-1$ or $1$, and with $\epsilon$ the function defined by $$\epsilon(x) = \begin{cases} 1 & x \geq 0 \\ -1 & x < 0. \end{cases} \tag{4}$$

The functions $\theta(x)$ and $\epsilon(x)$ can both be considered as special cases of a more general step function which takes the value $-\lambda$, with $\lambda$ any positive number, for $x < 0$, and which takes the value 1 for $x \geq 0$; $\theta$ and $\epsilon$ then correspond, respectively, to the cases $\lambda = 0$ and $\lambda = 1$. In certain applications, and particularly for network training, the discontinuous functions $\theta(x)$ and $\epsilon(x)$ are replaced by continuous "sigmoidal" or "squashing" functions which vary continuously between the respective limits 0,1 or $-1$, 1 as x crosses a narrow band around $x=0$; this fact should be kept in mind but does not affect the ensuing discussion in any significant way. Mc Culloch-Pitts neurons can be configured in layered "feedforward" networks, in which the outputs of neurons at a given layer are fed into the inputs of the neurons of the next layer, as in the basic "perceptron" described in U.S. Pat. No. 3,287,649 to Rosenblatt. Alternatively, the neurons can be configured in "recurrent" networks, in which the outputs of a layer are fed back into the inputs of the same layer, as in the networks described in U.S. Pat. No. 4,660,166 to Hopfield and U.S. Pat. No. 4,719,591 to Hopfield and Tank.

Although representing a potentially powerful new computational method, neural networks of the prior art suffer from a number of limitations, which we now describe.

1. Computational Limitations: Networks based on the Mc Culloch-Pitts neuron have some well-known computational limitations. (See Wasserman, op. cit., pages 30–36, and Hertz, Krogh and Palmer, op. cit., pages 96–97 and 130–131.) For example, a single layer perceptron cannot solve the problem of representing the "Exclusive Or" (XOR) function, $$v^{out} = XOR(v_1^{in}, v_2^{in}), \tag{5}$$

with the function XOR defined by the truth table

| $v^{out}$ | $v_1^{in}$ | $v_2^{in}$ | (6) |
|---|---|---|---|
| 0 | 0 | 0 | |
| 1 | 0 | 1 | |
| 1 | 1 | 0 | |
| 0 | 1 | 1. | |

The reason the Mc Culloch-Pitts neuron cannot represent XOR is simply illustrated by considering a sum variable S defined by $S = v_1^{in} + v_2^{in}$. To compute XOR as a function of S one need a function which gives 0 when $S=0$, which gives 1 when $S=1$, but which again gives 0 when $S=2$, corresponding respectively to the cases of 0, 1 or 2 inputs in the "on" state. This computation cannot be performed by a linear thresholding device, which can only do the computation of giving an output 0 when S is less than some value T, and an output of 1 when S is larger than T. In other words, as the variable S increases, the Mc Culloch-Pitts neuron can only switch once from "off" to "on", whereas to compute XOR one needs a neuron which can switch from "off" to "on", and then back to "off" again. To represent XOR using Mc Culloch-Pitts neurons, one needs at least a two-layer neural network.

A second computational limitation of networks based on the Mc Culloch-Pitts neuron has to do with convexity properties. A convex set n-dimensional space is a set with the property that if one picks any two points on the boundary, the straight line segment joining these points lies entirely within the set. In three dimensional space, a sphere is convex, and a cube is convex, but a bowl-shaped object is not convex. Returning now to neural nets, a standard result in perceptron theory states that a one- or two-layer perceptron can only select for input vectors $(v_1^{in}, \ldots, v_n^{in})$ lying in a convex region in n-dimensional space; one must go to at least three-layer perceptrons to select for non-convex regions.

2. Power dissipation in the voltage divider: Prior art patents (see, e.g. U.S. Pat. No. 4,660,166 to Hopfield) use a pair of complementary negative and positive voltage neuronal output lines to realize weights of both signs; to get a positive (negative) synaptic matrix weight, a resistive voltage divider is connected respectively to the positive (negative) line. In this realization of the synaptic matrix, power dissipation in the resistors imposes an important limitation on designing very large scale integrated neural network circuits. It would thus be desirable to have a non-dissipative realization of the weights, and a number of ideas have been suggested in the prior art to try to achieve this. Coherent optical neurons have been suggested which realize the weights in non-dissipative fashion as volume holograms in photorefractive crystals, and which can potentially give a very high synaptic density; see especially Psaltis, Brady and Wagner, "Adaptive optical networks using photorefractive crystals", Applied Optics Vol. 27, No. 9, May 1, 1988, pages 1752-1759, and an improvement on the method of the Psaltis et al. article disclosed in U.S. Pat. No. 4,959,532 to Owechko. The methods of both of these prior-art references suffer from the disadvantage of requiring very critical mechanical alignment in order to achieve the necessary coherence, which will make it hard to achieve eventual miniaturization and mass production. In electronic circuit technology, a realization of the neural weights by capacitors, which is non-dissipative and has other advantages as well, has been described by Çilingiroğlu, "A Purely Capacitive Synaptic Matrix for Fixed-Weight Neural Networks", IEEE Transactions on Circuits and Systems, Vol. 38, No. 2, February 1991, pages 210-217. The method of this prior-art reference has appealing features, but requires an elaborate clocking scheme with three clock phases, corresponding to precharge, evaluation and output switching states of the capacitive network. Similar clocking requirements are inherent in two earlier switched-capacitor neural network methods, described in Tsividis and Anastassiou, "Switched-Capacitor Neural Networks", Electronics Letters Vol. 23, No. 18, August 1987, pages 958-959, and in Horio, Nakamura, Miyasaka and Takase, "Speech Recognition Network With SC Neuron-Like Components", Proceedings of the 1988 IEEE International Symposium on Circuits and Systems, Vol. 1, pages 495-498.

SUMMARY OF THE INVENTION

Briefly described, the invention comprises a neural network architecture, in which the neural inputs are phase-coherent alternating current signals. Processing of the neural inputs consists of two steps: an initial linear step in which a weighted sum of the input signals is formed, followed by a nonlinear step in which this sum is processed to give an output.

In its simplest form the invention is based on a generalized neuron described mathematically by the formula $$v_i^{out} = \theta \left( \left| \sum_{k=1}^{n} w_{ik} v_k^{in} + u_i \right| - t_i \right), i = 1, \ldots, m, \quad (7)$$

in which $v_k^{in}$ and $v_i^{out}$ are respectively inputs and outputs which take values 0 or 1, while $w_{ik}$, $u_i$ and $t_i$ are respectively weights, an offset value, and a threshold which can take any real number values. Also, $|\ldots|$ indicates the absolute value or modulus, and $\theta$ is the Heaviside step function defined by $\theta(x)=1$ for $x \geq 0$ and $\theta(x)=0$ for $x<0$. A complementary neuron can be defined with $\theta(x)$ replaced by $\theta(-x)=1-\theta(x)$. In representing Eq. (7) by a circuit, the quantities $v_k^{in}$ and $u_i$ are the amplitudes of phase-coherent alternating current signals with zero phase shifts relative to one another, while the outputs $v_i^{out}$ are the amplitudes of a second set of alternating currents which in general can have a different frequency from the inputs. The thresholds $t_i$ are represented by direct current signals, and the weights $w_{ik}$ are implemented by a capacitive voltage divider coupled to a summation line for each of the m outputs, with the number m in general different from the number n of the inputs.

In order to accommodate both positive and negative weights $w_{ik}$, the input signals and the offset signal each consist of a two-phase pair of alternating current signals, the + phases of which all have zero relative phase shifts, and the − phases of which are 180 degrees out of phase with the + phases and, in the preferred embodiment, have magnitudes equal to the magnitudes of the corresponding + phases; in other words, the two phases are always opposite in sign to one another. To achieve the neuron output i, the + component of input $v_k^{in}$ is coupled to summation line i through a capacitance $C_{ik}^+$, and the − component of input $v_k^{in}$ is coupled to summation line i through a capacitance $C_{ik}^-$. This is done for each k from 1 to n, and the + and − components of the offset signal $u_i$ are also capacitively coupled to the summation line i, giving an alternating current sum signal representing the linear superposition $$\sum_{k=1}^{n} w_{ik} v_k^{in} + u_i,$$

with the weights $w_{ik}$ proportional to the respective differences $C_{ik}^+ - C_{ik}^-$. The sum signal is then passed through a low input capacitance follower/amplifier, which isolates the input circuit from parasitic capacitances in the output circuit and provides signal amplification as needed.

The remainder of the signal processing is nonlinear. After the follower/amplifier, the signal is rectified and is filtered to remove the alternating current component. The direct current component of the signal from the rectifier and a signal proportional to the threshold $t_i$ are used as inputs to a comparator, the output from which is used to gate a two-phase alternating current output signal $v_i^{out}$. In the final stage of a neural net, the comparator output can be used directly as the output signal.

The alternating current neuron as just described can compute the "Exclusive Or" (XOR) logical operation at the one neuron level, and by use of capacitances realizes the network weights non-dissipatively. When the capacitances are replaced by an R-C phase-shifter network, the neuron can achieve complex number weights, with real parts which can be continuously adjusted from positive to negative using a single adjustable resistance.

These and other features of the invention may be more fully understood by reference to the following drawings.

BRIEF DESCRIPTION OF THE DRAWINGS

FIG. 2b illustrates the phase relationships between the + and − phase components of any one of the two-phase alternating current signals used as the neuron input and offset signals. Parts (i), (ii), and (iii) illustrate, respectively, the + phase waveform, the − phase waveform, and the two phases drawn as complex vectors in a phase diagram.

FIGS. 2c and 2d illustrate the signal flow through the nonlinear processing part of the neuron. FIG. 2c illustrates the case in which the neuron output is zero, while FIG. 2d illustrates the case in which the neuron output is non-zero. Parts (i), (ii), (iii), and (iv) illustrate, respectively, the waveforms at the summation line, at the filter output assuming perfect filtering, at the comparator output, and at the + phase line of the neuron output.

FIG. 3 is the full circuit diagram for the signal-processing elements which are illustrated in block diagram form in FIG. 2a.

FIG. 5 illustrates an alternative embodiment of the neuron in which $\theta(x)$ is replaced by $\epsilon(x)$, where the latter is a step function which takes the values −1 or +1.

FIG. 6 illustrates an alternative embodiment of the alternating current to direct current processor segment of FIG. 2a, in which rectification is replaced by heterodyne mixing with an input phase reference signal, thereby yielding the standard Mc Culloch-Pitts neuron.

FIG. 7 illustrates a generalized neuron which, when combined with the output option of FIG. 5, implements the neuron used in the Hopfield model for associative memory.

DETAILED DESCRIPTION OF THE INVENTION

Figure 1:
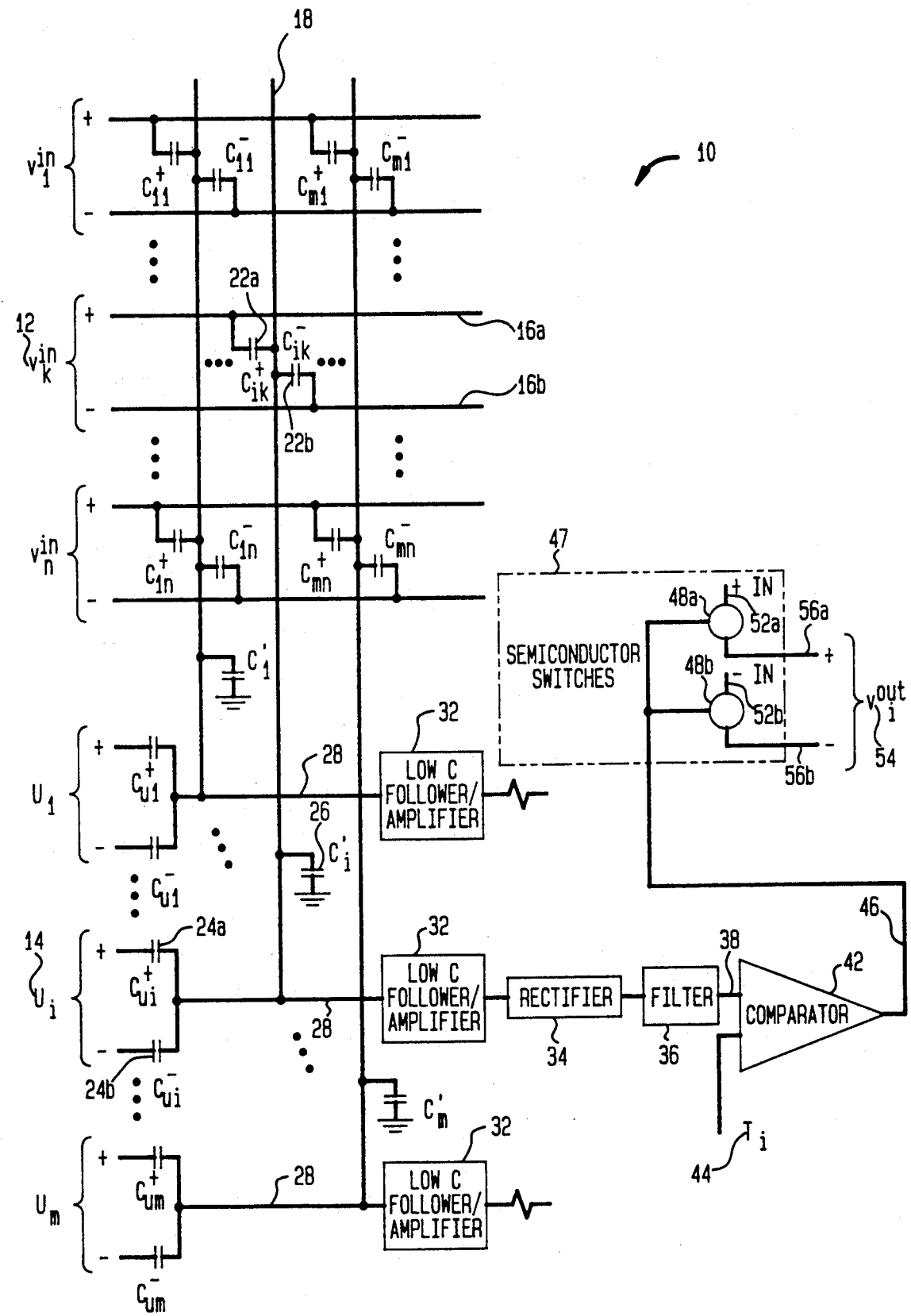
FIG. 1 is a schematic of the preferred embodiment of the invention, illustrating the couplings of the inputs $v_1^{in}$ and $v_n^{in}$ to the summation lines for the outputs $v_1^{out}$ and $v_m^{out}$, together with the coupling of the k th input to the i th summation line and the output processing yielding $v_i^{out}$.

During the course of this description like numbers will be used to identify like elements according to the different views which illustrate the invention.

The invention is based on a generalized neuron described by Eq. (7), repeated here, $$v_i^{out} = \theta\left(\left|\sum_{k=1}^{n} w_{ik}v_k^{in} + u_i\right| - t_i\right), i = 1, \ldots, m, \quad (7)$$

which forms the mathematical basis for the preferred embodiment. One notes two features of Eq. (7) which relate directly to capabilities of the preferred embodiment. The first feature is that in the limit as the offset signal $u_i$ becomes large and positive, one has $$\left|\sum_{k=1}^{n} w_{ik}v_k^{in} + u_i\right| \rightarrow \sum_{k=1}^{n} w_{ik}v_k^{in} + u_i, \quad (8)$$

and so Eq. (7) reduces in this limit to Eq. (1), $$v_i^{out} = \theta\left(\sum_{k=1}^{n} w_{ik}v_k^{in} - t_i'\right), \quad (1')$$

with effective threshold $t'_i = t_i - u_i$. Thus, if $u_i$ in Eq. (7) is allowed to be much larger than the sum over the weighted inputs, and if an offsetting displacement is made in the threshold $t_i$, the generalized neuron reduces to the standard Mc Culloch-Pitts neuron. The second feature is that the generalized neuron of Eq. (7), as a function of the sum $S_i = \Sigma_{k=1}^{n} w_{ik}v_k^{in}$, gives output 0 for $-t_i < S_i + u_i < t_i$, and output 1 for either $S_i + u_i < -t_i$ or $S_i + u_i > t_i$, and so selects for $S_i$ outside a specified interval. Similarly, the complementary neuron with $\theta$ replaced by $1 - \theta$ selects for $S_i$ inside a specified interval. As a result, Eq. (7) can represent the XOR function as, for example, $$v^{out} = \theta(|v_1^{in} - v_2^{in}| - \tfrac{1}{2}), \quad (9a)$$

and the complementary form of Eq. (7) can represent XOR as $$v^{out} = \theta(\tfrac{1}{2} - |v_1^{in} + v_2^{in} - 1|), \quad (9b)$$

both of which satisfy the truth table of Eq. (6). More generally, what has just been shown is that Eq. (7) and its complementary form can select for input vector $(v_1^{in}, \ldots, v_n^{in})$ lying in either the region exterior to or the region between two parallel hyperplanes. The former region is not convex, and so there is no convexity limitation for the generalized neuron, even at the single layer level. Hence the generalized neuron of Eq. (7) has computational capabilities superior to those attainable by the Mc Culloch-Pitts neuron. Further generalizations beyond Eq. (7) will be discussed later, in connection with alternative embodiments of the invention.

The preferred embodiment of the invention 10 is illustrated in FIG. 1. FIG. 1 depicts an entire layer of a neural network in which n inputs $v_k^{in}$, $k = 1, \ldots, n$ are processed by m neurons to give m outputs $v_i^{out}$, $i = 1, \ldots, m$. In general the number n will differ from the number m. The inputs are represented by a two-phase pair 12 of alternating current signals $\pm v_k^{in} e^{j\omega t}$, $k = 1, \ldots, n$, of maximum modulus unity in arbitrary units, with the angular frequency $\omega$ an arbitrary parameter characterizing the network layer in question. Although in the preferred embodiment the + and − phase input signals are taken to have equal magnitudes, this is not necessary for the functioning of the invention. More generally, the k th input pair can have the form $+v_k^{in} e^{j\omega t}$, $-\lambda_k^{in} v$-

$v_k^{in} e^{j\omega t}$, with $\lambda_k^{in}$ a positive scale factor of arbitrary magnitude. When $\lambda_k^{in} \neq 1$, the disparity in the magnitudes of the two phases of the input signals can be compensated by a corresponding adjustment of the couplings of the input signals to the neural network. The offset values $u_i$, $i=1, \ldots, m$ are represented by a two-phase pair 14 of offset signals $\pm U_i e^{j\omega t}$, $i=1, \ldots, m$, with the voltage amplitudes $U_i$ proportional to the offset values $u_i$ as explained below. Again, although the + and − phases of the offset signals are assumed to have equal magnitudes, this is not necessary for the functioning of the invention. More generally, the i th offset pair can have the form $+U_i e^{j\omega t}$, $-\lambda_i^{off} U_i e^{j\omega t}$, with $\lambda_i^{off}$ a positive scale factor. The n pairs of + phase input signal lines 16a and — phase input signal lines 16b are coupled to m summation lines 18 by capacitors 22a, 22b, so that for example, the + component of input k is connected to line i with the capacitor $C_{ik}^+$ 22a, and the − component of input k is connected to line i with the capacitor $C_{ik}^-$ 22b. The ± components of the offset signal $U_i$ are also coupled to line i by capacitors $C_{ui}^\pm$ 24a, 24b, and line i is coupled to ground by a capacitance $C_i'$ 26, which can be either an explicit circuit element or the parasitic capacitance of the input circuit to ground.

Analysis of the input circuit voltage divider comprising elements 12-26 shows that it corresponds to Eq. (7) with the weights given by $$w_{ik} = (C_{ik}^+ - C_{ik}^-)/D_i, \tag{10a}$$

and with the offset value $u_i$ given by $$u_i = U_i(C_{ui}^+ - C_{ui}^-)/D_i, \tag{10b}$$

where $D_i$ is given by $$D_i = C_i' + C_{ui}^+ + C_{ui}^- + \sum_{l=1}^{n}(C_{il}^+ + C_{il}^-). \tag{10c}$$

It should be noted that Eq. (7) is functionally the same neuron if all terms inside the $\theta$ function are rescaled by the same constant factor, and so by a suitable choice of this factor a general network can always be represented in capacitive fashion with weights given by Eqs. (10a,b,c). While in principle the presence of the $C_i'$ term does not interfere which network function, in practice parasitic capacitances are not accurately controllable, and so it is desirable to keep them as small as possible.

The remainder of FIG. 1 consists of the nonlinear output processing for the neurons; this is shown explicitly only for the i th line but is the same for the other m−1 summation lines. The signal on summation line i is carried by line 28 into the output part of the circuit, which begins with a low input capacitance, high input impedance follower/amplifier 32 which minimizes the parasitic capacitive loading of the summation line, thereby minimizing the values of the coupling capacitors 22a, 22b, 24a, 24b which are needed to achieve a given accuracy, and which provides signal amplification as needed for the subsequent output processing. The follower/amplifier output is coupled to a rectifier 34. The output from rectifier 34 is passed through a filter 36 which removes the alternating current component of the signal. The direct current signal from rectifier 34 and filter 36 is coupled by line 38 to a comparator 42, along with a direct current threshold signal $T_i$ 44, which is chosen so that the difference $D_i$ between the comparator inputs is proportional to the quantity $|S_i + u_i| - t_i$. Assuming that the rectifier circuit has been compensated for rectifier voltage drop, the bias $T_i$ is related to the threshold $t_i$ of Eq. (7) by $$T_i = K_r t_i, \tag{11}$$

with $K_r$ a proportionality constant characteristic of rectifier and filtering circuit 34, 36.

The output signal from comparator 42 is carried on line 46 to a pair of semiconductor switches 47, which gate the output. Switch 48a gates the + component 52a, and switch 48b gates the − component 52b, of the alternating current output phase reference signal, which can be of different frequency from the neuron inputs. The two phase output signal 54, represented by $\pm v_i^{out} e^{j\omega' t}$, with $\omega'$ the output frequency, appears on the output signal lines 56a, 56b, which in a multilayer network will be input signal lines 16a, 16b for neurons of the next layer. Although the + and − phases of the output signals have been assumed to have equal magnitudes, this again is not necessary, and more generally the i th output pair can have the form $+v_i^{out} e^{j\omega' t}$, $-\lambda_i^{out} v_i^{out} e^{j\omega' t}$, with $\lambda_i^{out}$ a positive scale factor. Whenever only positive weights, or positive offset values are needed, the circuit just described can be simplified by eliminating the corresponding − phase input lines 16b and − phase input coupling capacitors 22b, or − phase offset coupling capacitors 24b, leaving just a single phase corresponding to elements labeled with the superscript + in FIG. 1. If all weights are positive in the subsequent neuron layers fed by the neuron output, the −phase output line 56b and its corresponding circuit elements can be omitted. In terms of the scale factors introduced above, these simplifications correspond, respectively, to taking $\lambda_k^{in} = 0$, $\lambda_i^{off} = 0$, or $\lambda_i^{out} = 0$.

Figure 2A:
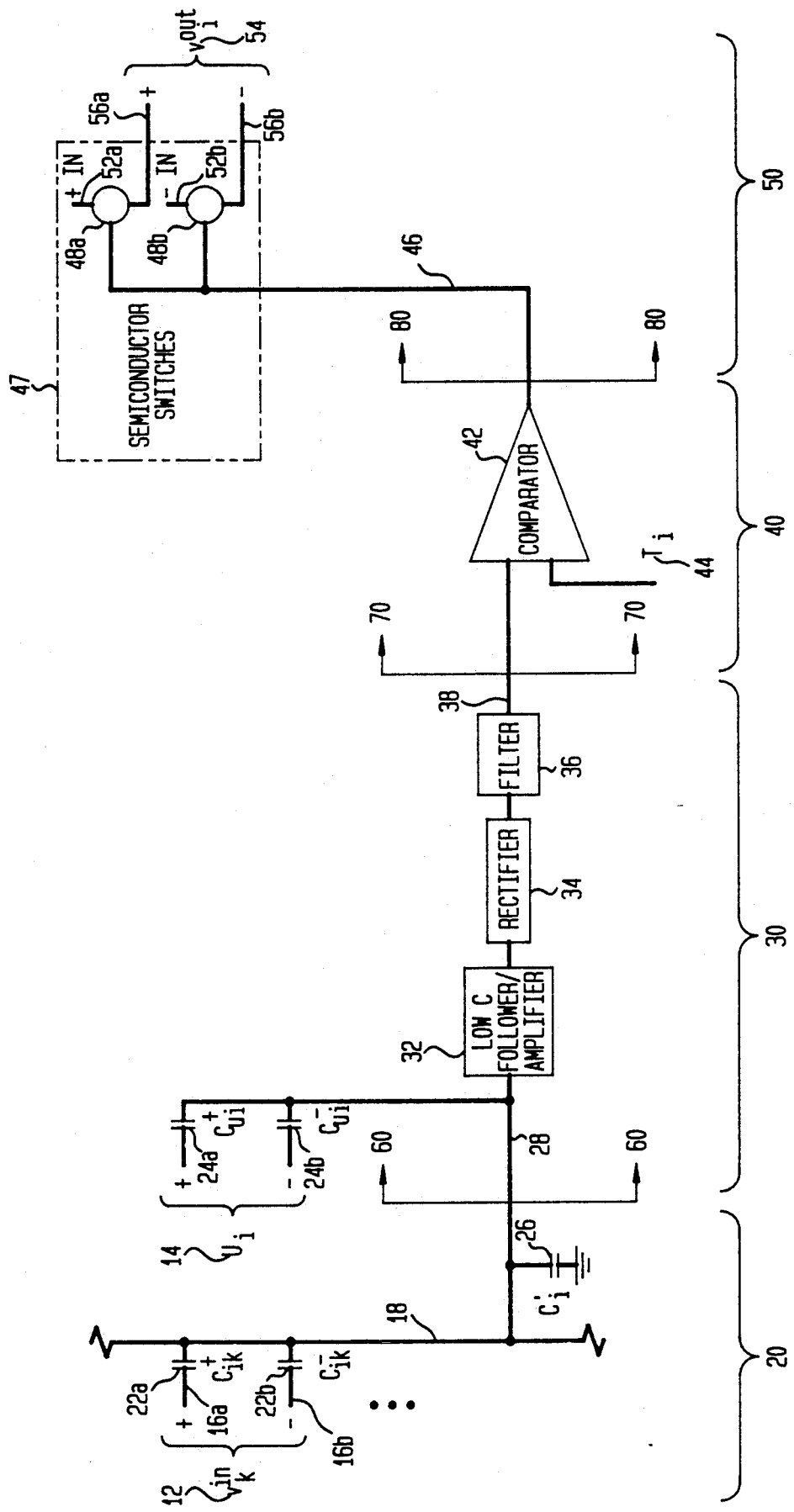
FIG. 2a is a detail portion of the schematic of FIG. 1, illustrating only the circuitry associated with the i th summation line, in other words, associated with a single neuron, with only the k th input out of the n inputs shown explicitly.

FIG. 2a illustrates a detail portion of the preferred embodiment of the invention 10. This figure breaks out that part of FIG. 1 which refers to the single summation line i together with its input and output circuitry, that is, to a single neuron. All numbered elements in FIG. 1 appear again in FIG. 2a. From FIG. 2a, it is clear that since connecting line 28 is simply an extension of summation line 18, the offset signal $U_i$ couples in precisely the same manner as the n input signals $v_k^{in}$, $k=1, \ldots, n$. Thus, from the point of view of a single neuron, the offset signal can be regarded as an additional input signal $v_{n+1}^{in} = U_i$ coupling to summation line i 18 through capacitors $C_{in+1}^+ = C_{ui}^+$, $C_{in+1}^- = C_{ui}^-$. In FIG. 2a the neuron 10 is broken into four segments 20, 30, 40, 50 by break lines 60—60, 70—70 and 80—80. The segment 20 to the left of break lines 60—60 is the linear input portion of the circuit, which processes the alternating current input signals to give the input signal contribution to the alternating current sum signal on line 28. The segment 30 between break lines 60—60 and 70—70 is the the nonlinear alternating current (AC) to direct current (DC) processor, consisting in the preferred embodiment of the coupling to the offset signal, the low input capacitance follower/amplifier, and the rectifier and filter. The segment 40 between break lines 70—70 and 80—80 is the comparator for performing the thresholding operation, and the segment 50 to the right of break lines 80—80 is the output portion of the circuit, which converts the comparator output on line 46 to a two-phase alternating current output signal. Reference to this division will be made in the discussion of FIG. 3, which illustrates a circuit diagram for the signal processing elements, and of FIGS. 4-9, which illustrate alternative embodiments of the invention.

FIG. 2b illustrates the waveforms of the input signals $v_k^{in}$ 12, k=1, ..., n and the offset signals $U_i$ 14, i=1, ..., m, for the specific case $\lambda_k^{in} = \lambda_i^{off} = 1$ of equal magnitudes of the + and − phase components, with the amplitudes in arbitrary units. All of the + phase input and offset signals have waveforms as illustrated in Part (i), with amplitudes proportional to 58a, and all of the − phase input and offset signals have waveforms as illustrated in Part (ii), with amplitudes proportional to 58b, and so the zero-crossings of all of the input and offset signals entering 10 are simultaneous. Part (iii) is a phase diagram in which the origin of the complex plane is the point 61. On this phase diagram the + and −phase components of the input and offset signals are respectively represented, in arbitrary amplitude units, by the oppositely directed complex vectors 62a and 62b, which are 180 degrees out of phase with one another.

FIGS. 2c and 2d illustrate the waveform flow through the nonlinear processing portion of the circuit, which lies to the right of break lines 60—60 in FIG. 2a. FIG. 2c illustrates the case in which the the neuron output is zero, while FIG. 2d illustrates the case of nonzero neuron output. Part (i) of both figures illustrates the AC waveform 64 which appears on line 28. After rectification and filtering this gives rise to a DC waveform 66 on line 38, illustrated in Part (ii) of both figures in comparison with the DC waveform 67 of the threshold signal 44. Part (iii) shows the comparator output waveform 68 which appears on line 46, and Part (iv) shows the corresponding AC waveform 72 which appears on the + phase output line 56a. In FIG. 2c, the DC signal 66 lies below threshold 67, giving a comparator output 68 on the voltage 0 low rail and a corresponding output waveform 72 with amplitude zero. In FIG. 2d, in which the AC waveform 64 has larger amplitude than in FIG. 2a, the DC signal 66 lies above threshold 67, giving a comparator output 68 on the voltage V high rail and a corresponding output waveform 72 with amplitude unity in arbitrary units. The output AC frequency of waveform 72 has been illustrated to be different from the input AC frequency of waveform 64, as is allowed in feed-forward networks; in recurrent networks, in which the outputs are fed back into the inputs, the waveforms 72 and 64 have the same frequency.

Figure 3:
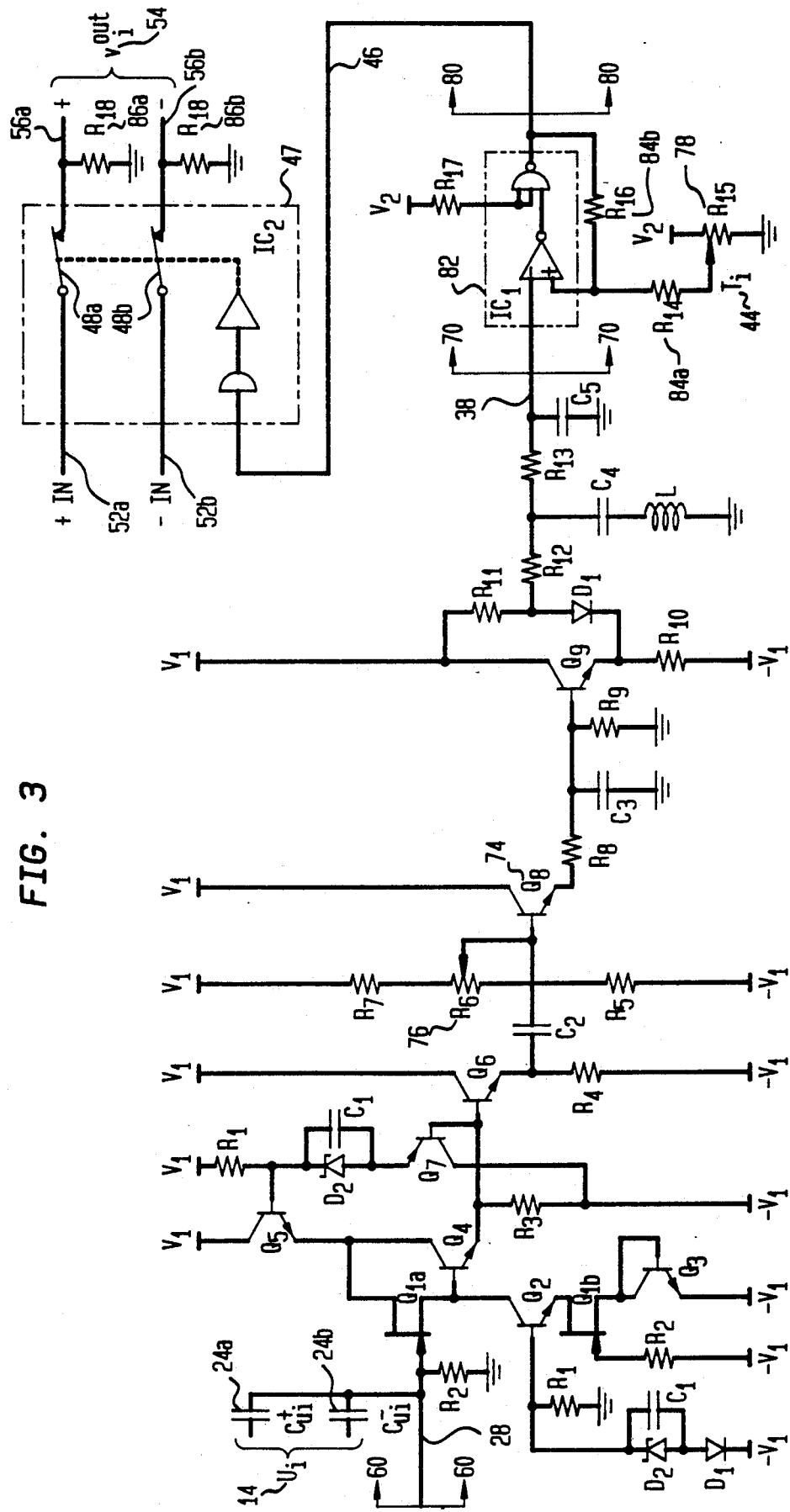

FIGS. 1 and 2a give a detailed schematic only for the input segment 20 to the left of break lines 60—60, and illustrate only in block form the subsequent segments 30, 40, and 50. While these can be realized in many ways, a specific circuit realization of the signal processing elements to the right of break lines 60—60 is diagrammed in FIG. 3. The circuit of FIG. 3 corresponds to the neuron complementary to Eq. (7), that is, with $\theta$ in Eq. (7) replaced by $1-\theta$, so that when the rectifier DC output on line 38 is smaller than threshold 44 the output switches 48a,b are "on", and when the signal on line 38 exceeds threshold 44, the output switches are "off". To produce the neuron described by Eq. (7), an additional inverter, not shown in FIG. 3, is inserted in comparator output line 46. The circuit of FIG. 3 was tested at an AC input frequency of 10 MHz, with up to 4 V peak to peak on line 28.

The DC supply voltage rails utilized in the circuit of FIG. 3 are $V_1 = 15$ V, $V_2 = 5$ V. The follower input stage 32 consists of a FET input follower, using a cascode configuration to provide very low input capacitance. A circuit input capacitance of less than 1 pF can be achieved this way. The rectifier stage 34 consists of a transistor $Q_8$ 74 configured as a rectifier, which is DC-biased through adjustable resistor $R_6$ 76 to compensate the rectifier voltage drop. The filtering stage 36 consists of a low-pass filter, an active buffer, a notch filter and a second low-pass filter, to achieve rejection of both the AC fundamental and harmonics generated by rectification. The threshold 44 is obtained from adjustable resistor $R_{15}$ 78 acting as a voltage divider. The comparator circuit 42 uses half of a dual comparator chip $IC_1$ 82, with hysteresis to provide noise and ripple immunity incorporated through the network consisting of resistors $R_{14}$ 84a and $R_{16}$ 84b. The hysteresis depends on the value of the threshold voltage $T_i$, and has a typical magnitude of tens of mV, with a maximum value, for the circuit of FIG. 3, of 100 mV. This sets the switching sensitivity limit of the neuron. The semiconductor output switch $IC_2$ 47 uses half of a 4-switch CMOS chip. A termination resistor $R_{18}$ 86a,b is employed on each of the output lines 56a,b; this should be augmented by an active buffer on each output line, not shown in FIG. 3, if driving many neurons in the next neural network layer. The parts list for the circuit of FIG. 3 is as follows:

| PARTS LIST FOR FIG. 3 | |
|---|---|
| Element | Part |
| $Q_{1a}, Q_{1b}$ | 2N3954 Dual FET |
| $Q_2-Q_6$ | CA3183AE Transistor Array |
| $Q_7$ | 2N3906 |
| $Q_8, Q_9$ | 2N3904 |
| $D_1$ | 1N914 |
| $D_2$ | 1N4620 3.3 V Zener Diode |
| $C_1$ | 0.1 μF |
| $C_2$ | 0.005 μF |
| $C_3$ | 56 pF ± 2% |
| $C_4$ | 240 pF ± 5% |
| $C_5$ | 10 pF |
| L | 1 μH |
| $R_1$ | 3.3 KΩ |
| $R_2$ | 22 MΩ |
| $R_3$ | 5.1 KΩ |
| $R_4$ | 3.6 KΩ |
| $R_5$ | 24.9 KΩ ± 1% |
| $R_6$ | 5 KΩ Trim potentiometer |
| $R_7$ | 20 KΩ ± 1% |
| $R_8$ | 240 Ω |
| $R_9$ | 100 KΩ |
| $R_{10,13,14}$ | 10 KΩ |
| $R_{11}$ | 30 KΩ |
| $R_{12}$ | 100 Ω |
| $R_{15}$ | 500 Ω 10 turn potentiometer |
| $R_{16}$ | 510 KΩ |
| $R_{17}$ | 1 KΩ |
| $R_{18}$ | 560 Ω |
| $IC_1$ | 1/2 NE521A |
| $IC_2$ | 1/2 IH5145CPE |

Figure 4B:
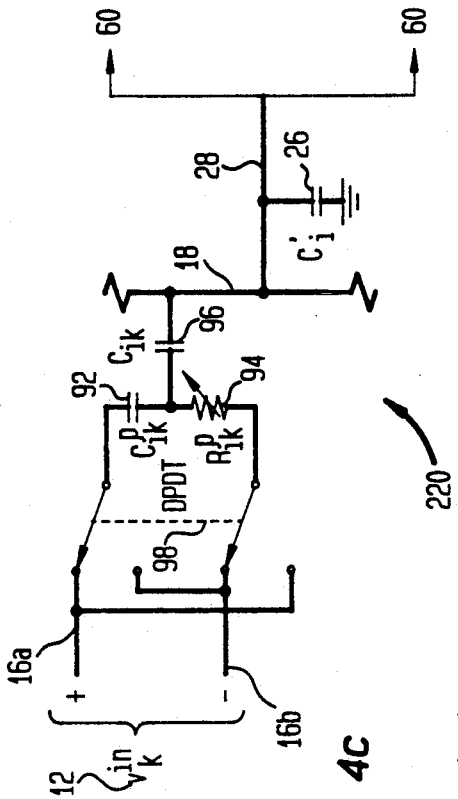
FIG. 4b illustrates a modification of the embodiment of FIG. 4a which yields a weight with any phase in the entire complex plane.

The neuron of Eq. (7) can be further generalized by replacing Eq. (7) by $$v_i^{out} = e^{j\phi_i\theta}\left(\left|\sum_{k=1}^{n} w_{ik}v_k^{in} + u_i\right| - t_i\right), i = 1, \ldots, m, \quad (12)$$

in which the $v_k^{in}$ are complex numbers of maximum modulus unity, and $w_{ik}$ and $u_i$ are complex numbers which can take any values. The neuron inputs $v_k^{in}$ are now represented by two-phase alternating current signals $\pm v_k^{in}e^{j\omega t}$, k=1, ..., n, of maximum modulus unity in arbitrary units, with the fact that the $v_k^{in}$ have complex phases appearing as constant phase shifts of the corresponding input signals. Similarly, the offset values are now represented by offset signals $\pm U_i e^{j\omega t}$, $i = 1, \ldots, m$, again with the complex phases of the offset values $u_i$ interpreted in circuit terms as constant phase shifts of the corresponding offset signal amplitudes $U_i$. In order to represent complex weights $w_{ik}$, the input segment 20 to the left of break lines 60—60 in FIG. 2a may be modified as illustrated in FIG. 4a and FIG. 4b, with only the circuitry associated with the input $v_k^{in}$ shown explicitly. In the modified input segment 120 of FIG. 4a, the two-phase input is coupled through an R-C phase-shifter composed of a capacitor $C_{ik}^p$ 92 and a variable or fixed resistor $R_{ik}^p$ 94, which are coupled by capacitor $C_{ik}$ 96 to summation line i 18. The analysis of the voltage divider corresponding to FIG. 4a gives a somewhat complicated formula for the weight $w_{ik}$, which simplifies in the limit $C_{ik} << C_{ik}^p$, corresponding to negligible loading of the phase-shifter by the voltage divider, to $$w_{ik} = \frac{C_{ik} e^{j\psi_{ik}}}{C_i' + \sum_{i=1}^{n} C_{il}}, \tag{13a}$$

with the phase given by $$e^{j\psi_{ik}} = \frac{(\omega C_{ik}^p)^2 - (1/R_{ik}^p)^2 + 2j\omega C_{ik}^p/R_{ik}^p}{(\omega C_{ik}^p)^2 + (1/R_{ik}^p)^2}. \tag{13b}$$

Even when $C_{ik} \sim C_{ik}^p$, the loading condition leading to Eq. (13) can be satisfied by including a stage of active buffering in the input lead of $C_{ik}$. Equation (13) shows that as the resistor $R_{ik}^p$ varies from 0 to $\infty$, the phase $\psi_{ik}$ varies from $\pi$ to 0 in the upper half complex plane.

To produce a weight with phase in the entire complex plane, one proceeds as in the modified input segment 220 illustrated in FIG. 4b, by adding a double-pole double-throw switch 98, or any equivalent means to reverse the polarity of the inputs to the phase shifter.

Figure 4C:
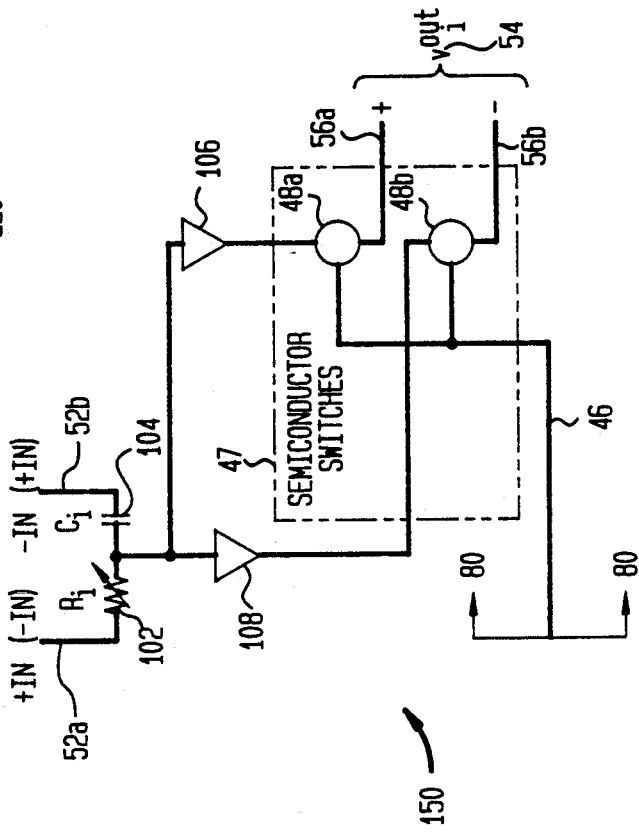
FIG. 4c illustrates an alternative output embodiment which gives the output signal a constant phase shift relative to the output phase reference signal.
Figure 4A:
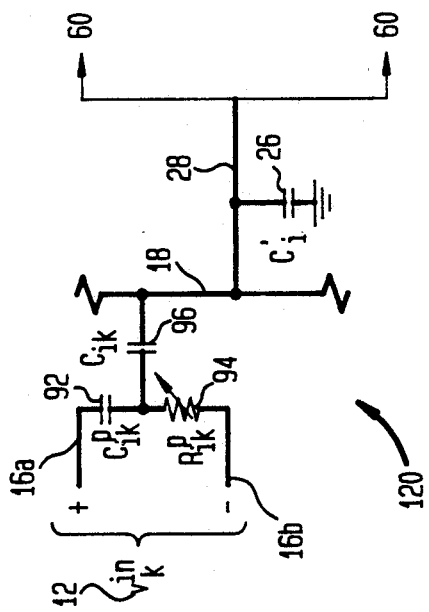
FIG. 4a illustrates an alternative input embodiment in which use of an R-C phase-shifter gives a weight with any phase in the upper half complex plane.

To produce an output phase $e^{j\phi_i}$, the output segment 50 to the right of break lines 80—80 in FIG. 2a may be modified to give the segment 150 illustrated in FIG. 4c, in which a phase-shifter is connected between the + phase component 52a and the − phase component 52b of the alternating current output phase reference signal. The phase shifter is composed of a resistor $R_i$ 102 and a capacitor $C_i$ 104, together with means to invert the polarity of the reference inputs 52a, 52b to give phase coverage of the full complex plane. The phase shifter feeds through a follower or buffering op-amp 106 into switch 48a gating the + output line, and through an inverting op-amp 108 into switch 48b gating the − output line. An alternate output arrangement, which applies equally well to the preferred embodiment, is to omit switch 48b, and instead to feed the output of switch 48a both directly to line 56a, and through an inverting op-amp, which performs the function of 108, to get the − output on line 56b. The value of the output phase $\phi_i$ can be fixed, can be externally controlled, or can be made any specified function of the AC sum signal $S_i + u_i$ on line 28 and the threshold $T_i$ 44. A simple example of the function alternative would be to choose the output phase reference signals 52a,b to be phase-coherent with the neuron inputs $v_k^{in}$, and to take the output phase $\phi_i$ equal to the phase of the sum signal $S_i + u_i$.

In FIGS. 4a-c R-C phase-shifters are employed, but any other phase-shifting means is equally acceptable; for example, in sufficiently high frequency circuits, the use of delay lines to achieve the phase shifts may prove feasible.

The circuits illustrated in FIGS. 1, 2a, and 4c correspond to the neurons of Eqs. (7) and (12), which are constructed using the $\theta$ function of Eq. (1). Complementary neurons with $\theta(x)$ replaced by $\theta(-x) = 1 - \theta(x)$ can be realized in terms of the same circuits either by reversing the polarities of the rectifier 34 and the threshold 44, or by inserting an inverter in the comparator output line 46. Certain applications require the corresponding neuron constructed using the $\epsilon$ function of Eq. (4). This is achieved by replacing the output segment 50 to the right of break lines 80—80 in FIG. 2a by the modified output segment 250 illustrated in FIG. 5, in which the pair of semiconductor switches 47 has been replaced by a set of four semiconductor switches 109. The comparator output on line 46 directly drives switches 48a, 48b as before, and is passed through an inverter 110 before driving a second set of switches 112a, 112b. Thus, when the switches 48a, 48b are off, the switches 112a, 112b are on, and the output polarity is inverted as required by the $\epsilon$ function variant. To produce a constant phase shift of the $\epsilon$ function output, the output reference signals 52a, 52b in FIG. 5 can be derived from a phase-shifter plus follower and inverter circuit 102, 104, 106, 108, as in FIG. 4c.

One application in which the $\epsilon$ function variant is called for is the Hopfield model for associative memory. This model is based on a Mc Culloch-Pitts neuron of the form $$v_i^{out} = \epsilon \left( \sum_{k=1}^{n} w_{ik} v_k^{in} \right), \tag{14}$$

with the inputs $v_k^{in}$ taking the values $\pm 1$ and with the weights $w_{ik}$ forming a real symmetric matrix. In associative memory applications, one analyzes the error rate in recalling a stored memory $v_k^\mu$ by splitting the sum in Eq. (14), when this memory is used as input, into two terms according to $$\sum_{k=1}^{n} w_{ik} v_k^\mu = v_i^\mu (1 - C_i^\mu), \tag{15a}$$

with the so-called "crosstalk" term $C_i^\mu$ given by $$C_i^\mu = - \sum_{k=1}^{n} v_i^\mu (w_{ik} - \delta_{ik}) v_k^\mu, \tag{15b}$$

with $\delta_{ik}$ the usual Kronecker delta. For the neuron of Eq. (14), there are no recall errors provided that the crosstalk term satisfies the inequality $C_i^\mu < 1$. A corresponding error analysis can be carried out when a Hopfield associative memory is realized using the $\epsilon$ version of the generalized neuron of Eq. (7), with $t_i = u_i = u > 0$, $$v_i^{out} = \epsilon \left( \left| \sum_{k=1}^{n} w_{ik} v_k^{in} + u \right| - u \right). \tag{16}$$

Substituting a splitting of the sum as in Eq. (15a) into Eq. (16), a simple calculation indicates that there are no recall errors provided that two conditions are satisfied: the original condition $C_i^\mu < 1$, and an additional condition $C_i^\mu > 1 - 2u$. Provided that $u > 1$, the second condition leads to conditions on the associative memory parameters that, within a factor of 2, are no more stringent than those implied by the first condition. Hence the generalized neuron 10 of FIGS. 1 and 2a, with the output circuit modification of FIG. 5 and the offset and threshold chosen as in Eq. (16), can be used as the basis for a Hopfield model associative memory.

It is possible to realize the Hopfield model associative memory in two other ways within the general alternating current architecture of this invention. The first is to modify the circuit of FIG. 2a, as combined with the $\epsilon$ output option of FIG. 5, so as to directly represent the Mc Culloch-Pitts neuron of Eq. (14). This is done by replacing segment 30 lying between break lines 60—60 and 70—70 of FIG. 2a by the modified segment 130 illustrated in block form in FIG. 6. The signal from input segment 20 on line 28 couples to a low-C follower/amplifier 32 as before. The follower/amplifier output, instead of being rectified, is now mixed with a reference alternating current signal 114 of amplitude $u_i$ which is phase-coherent with the neuron inputs, in a heterodyne mixer 116. The heterodyne mixer 116 has a DC-coupled output so that the zero frequency, direct current component of the beat signal is retained. The mixer output is filtered 118 to remove alternating current components. This leaves a direct current signal on line 38 proportional to the projection of the amplitude of the summation line signal along an axis in the complex plane, which makes an angle with the real axis given by the phase of the reference signal amplitude $u_i$. For example, if the input signals $v_k^{in}e^{j\omega t}$ and the reference signal $u_ie^{j\omega t}$ have real amplitudes $v_k^{in}$ and $u_i$, the circuit of FIG. 6, when substituted into FIG. 2a, yields the neuron $$v_i^{out} = \theta\left(\sum_{k=1}^{n} Rew_{ik}v_k^{in} - t_i\right), \quad (17a)$$

with Re indicating the real part. When $t_i = 0$ and the output option of FIG. 5 is employed, this becomes $$v_i^{out} = \epsilon\left(\sum_{k=1}^{n} REw_{ik}v_k^{in}\right), \quad (17b)$$

which is the neuron needed for the Hopfield associative memory model. In either of the neurons of Eq. (17a) or Eq. (17b), use of the capacitive coupling scheme of FIG. 1 gives a non-dissipative realization of the network weights, while use of the phase-shifter coupling scheme of FIGS. 4a,b gives weights which are the real part of Eq. (13a), $$w_{ik} = \frac{C_{ik}}{\left(C_i + \sum_{i=1}^{n} C_{il}\right)} \frac{(\omega C_{ik}^p)^2 - (1/R_{ik}^p)^2}{(\omega C_{ik}^p)^2 + (1/R_{ik}^p)^2}. \quad (18)$$

As the resistor $R_{ik}^p$ varies from 0 to $\infty$, the weights of Eq. (18) vary continuously from negative to positive values.

Another way of realizing the Hopfield model neuron as an alternating current neuron follows from the identities $$\epsilon(S) = \epsilon(|S+u| - |S-u|) \quad (19a)$$

and $$\epsilon(S) = \epsilon(Su - S(-u)), \quad (19b)$$

both valid for any positive u. Applying these with S given by $$S = S_i = \sum_{k=1}^{n} w_{ik}v_k^{in} \quad (20)$$

gives the circuit illustrated in the block diagram of FIG. 7. The summation signal on line 28, entering from input segment 20 to the left of break lines 60—60, is split by a signal splitter and follower/amplifier 213 into two branches $S_{1i}$ 28a and $S_{2i}$ 28b. The signal 28a is coupled, together with a signal 214a of amplitude $u^+$, which is taken as the $+$ phase component of a reference signal in phase with the neuron inputs, to an AC to DC processor 216a. Similarly, the signal 28b is coupled, together with a signal 214b of amplitude $u^- = -u^+$, which is taken as the $-$ phase component of the same reference signal, to a second AC to DC processor 216b. To implement Eq. (19a), the AC to DC processors 216a,b are taken as the rectifier segment 30 lying between break lines 60—60 and break lines 70—70 of FIG. 2a, with the signals 214a,b of FIG. 7 corresponding respectively to the $\pm$ phase components of offset signal 14 of FIG. 2a. To implement Eq. (19b), the AC to DC processors 216a,b are taken as the heterodyne mixer alternative segment 130 of FIG. 6, in place of segment 30, with the signals 214a,b of FIG. 7 both coupling as signal 114 of FIG. 6. The low C follower/amplifier 32 may be omitted from processors 216a,b if its functions are adequately assumed by the follower/amplifier portion of signal splitter 213. The DC outputs $X_{1i}$ 38a from processor 216a and $X_{2i}$ 38b from processor 216b are fed into the two inputs of a comparator 218, the output of which on line 46 feeds, to the right of break lines 80—80, the output segment 250 of FIG. 5.

A generalization of the Hopfield model is described in an article by Noest, "Discrete-state phasor neural networks", Physical Review A Vol. 38, Aug. 15, 1988, pages 2196-2199. In the simplest version of the Noest generalization, Eq. (14) is replaced by $$v_i^{out} = \epsilon_3\left(\sum_{k=1}^{n} w_{ik}v_l^{in}\right). \quad (21)$$

Figure 8:
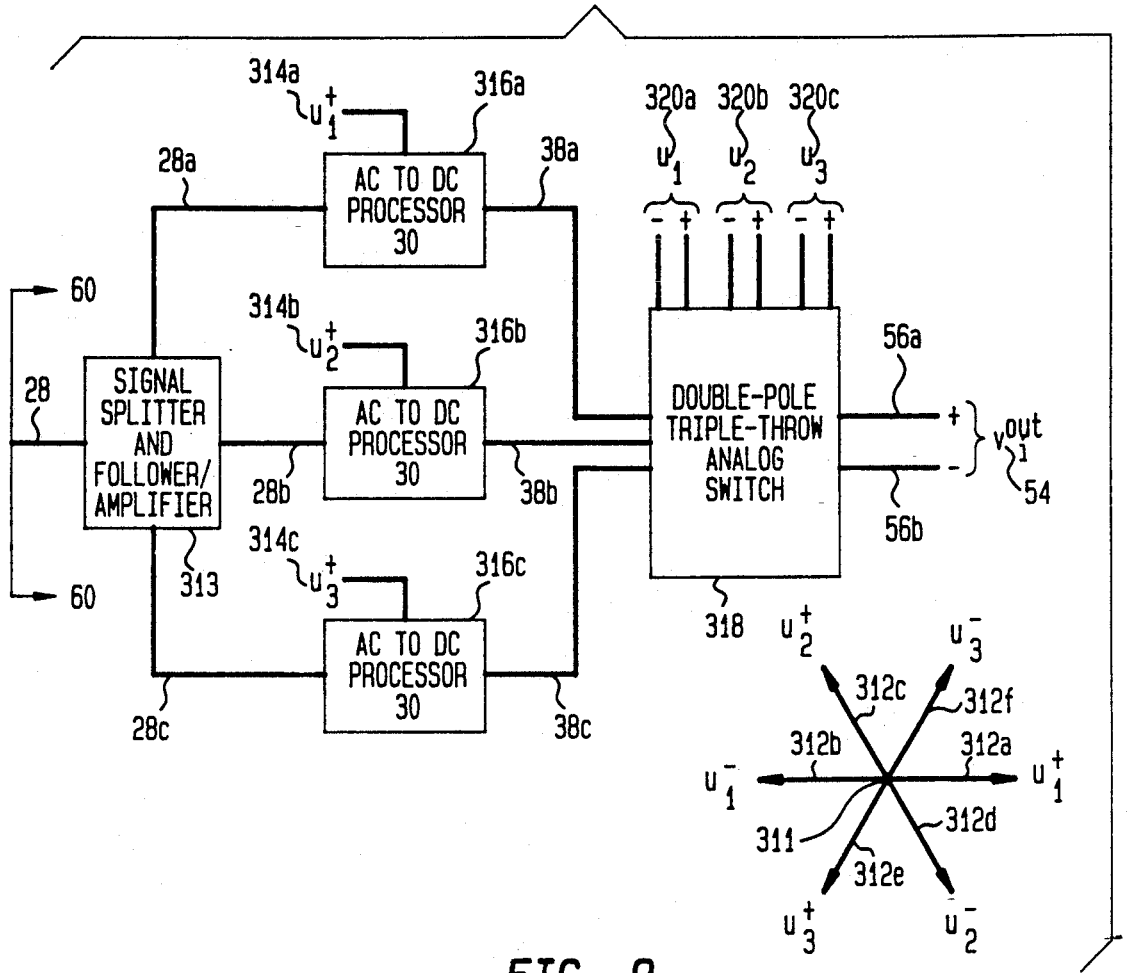
FIG. 8 illustrates a generalized neuron which implements an extension of the Hopfield model based on signals taking discrete values given by the three cube roots of unity.

The input variable $v_k^{in}$ takes discrete values given by the three cube roots of unity 1, $e^{2\pi j/3}$, $e^{4\pi j/3}$. The weights $w_{ik}$ form a complex hermitian matrix, and $\epsilon_3(z)$ is defined as that cube root of unity which lies closest to the complex phase $z/|z|$ of the complex number z. Noest briefly discusses the possibility of an optical realization of Eq. (21); the alternating current architecture of this invention makes possible an electronic circuit realization, as shown in FIG. 8. The circuit of FIG. 8 utilizes a six-phase set of alternating current reference signals, which, on a phase diagram in which the origin of the complex plane is the point 311, are represented by the six complex vectors $u_1^+$ 312b, $u_2^+$ 312b, $u_2^+$ 312c, $u_2^-$ 312*d*, $u_3^+$ 312*e*, and $u_3^-$ 312*f*. The basic construction of FIG. 8 is similar to that of FIG. 7, with the two-phase reference signal 214*a,b* of FIG. 7 replaced in FIG. 8 by three phases 314*a,b,c* of amplitude $u_1^+$, $u_2^+$, $u_3^+$, which are the three + phases of the six-phase set shown in the phase diagram. The input signal on line 28 comes from the phase-shifting input circuit 220 of FIG. 4*b*, which implements the complex weights needed in the Noest generalization. The signal 28 is split by a signal splitter and follower/amplifier 313 into three branches 28*a,b,c*, which together with the respective phase reference signals 314*a,b,c*, enter three AC to DC processors 316*a,b,c*, which functionally are identical to processors 216*a,b* of FIG. 7. The output lines 38*a,b,c* from the three AC to DC processors enter a double pole triple-throw analog switch 318. This switch connects the neuron output $v_i^{out}$ 54 appearing on output lines 56*a,b* to that one of the three two-phase pairs $u_1^\pm$ 320*a*, $u_2^\pm$ 320*b*, or $u_3^\pm$ 320*c* which corresponds to the largest of the three signals 38*a*, 38*b*, or 38*c*. For example, if the signal on line 38*b* is more positive than the signals on lines 38*a,c*, then the reference signal 312*c* of amplitude $u_2^+$ is switched to output line 56*a*, and the reference signal 312*d* of amplitude $u_2^-$ is switched to output line 56*b*. Similarly, when the signal on line 38*a* is the most positive, the reference signals $u_1^\pm$ are switched to the output, and when the signal on line 38*c* is the largest, then $u_3^\pm$ are used as the outputs.

Figure 9:
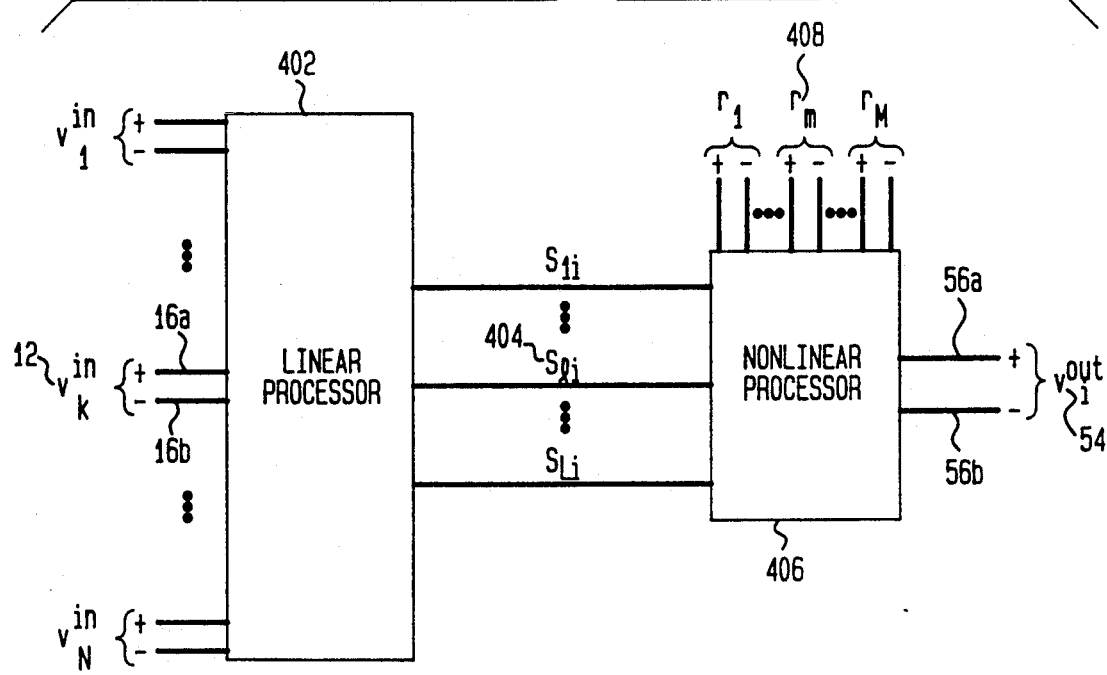
FIG. 9 illustrates a general form of the invention, in which more than one summation line is used within each individual neuron.

The neurons of FIGS. 1–8 are all examples of a general alternating current neuron which is illustrated in FIG. 9, and which constitutes the most general form of this invention. Phase synchronous two-phase alternating-current inputs $v_k^{in}$ 12, k=1, ..., N, which can include offset signals which control the operation of the neuron, enter on lines 16*a,b*, some of which can be the output lines 56*a,b* of other neurons, into the linear summing portion 402 of the neuron. The circuitry 402 produces L≦N linear combinations $S_{li}$, l=1, ..., L of the inputs with multiple complex weightings $w_{lik}$, $$S_{li} = \sum_{k=1}^{N} w_{lik} v_k^{in}, \; l = 1, \ldots, L. \tag{22}$$

The alternating current sum signals 404 of amplitude $S_{li}$, l=1, ..., L enter the nonlinear processing portion 406 of the neuron, together with M phase-coherent two-phase alternating current phase reference signals 408 of amplitude $r_m$, m=1, ..., M, which can have a frequency different from that of the inputs on lines 16*a,b*. The circuitry in 406 processes the sums $S_l$ and the phase references $r_m$ in a nonlinear fashion, to yield a single amplitude-limited two-phase alternating current output signal $v_i^{out}$ 54 on output lines 56*a,b*, which is phase-synchronous with the reference signals 408.

Any of the neurons of FIGS. 1–9 can be combined into layered neural networks, with the outputs of one layer of neurons serving as inputs to the next layer or, in recurrent configurations, with the outputs of a layer feeding back as inputs to the same layer. In such layered networks the neuron outputs must be phase-synchronized in groups, in such a way that all of the inputs to each individual neuron, including offset signals, are phase-coherent. The set of inputs to one neuron need not be phase-coherent with the set of inputs to another neuron elsewhere in the network. FIGS. 1–9 always employ an alternating current neural output signal 54. However, in the final layer of a network, the conversion of the neural output to alternating current form can be omitted, if it is more convenient in subsequent processing to have the output signal in other forms. For example, if the neuron of FIG. 2*a* is used in a final layer, the comparator output on line 46 can be used as the neural output, with the semiconductor switches 48*a,b* omitted.

The preferred embodiment of the invention comprehends fixed weight networks, in which the optimum weights are already known. If the networks are to be used for on-line training, provision has to made for on-line variation of the weights. For the phase-shifter realization of weights in FIGS. 4*a,b*, this involves making the variable resistor 94 and the coupling capacitor 96 subject to external, on-line control. Electrically controllable resistors have been described in U.S. Pat. No. 4,782,460 to Spencer and U.S. Pat. No. 4,839,700 to Ramesham et al. Both for the phase-shifter circuit and for the capacitive realization of weights in FIG. 1, on-line control of capacitors can be achieved by making each coupling capacitor 96 or 22*a,b* a parallel-wired composite of P+1 components of capacitance C, 2C, 4C, ..., $2^P C$. With P+1 externally controlled analog switches on the parallel branches, this arrangement can achieve a stepped capacitance taking the values 0, 1, 2, 3, ..., $2^{P+1}-1$ in units of C. Similar statements hold for the phase-shifter output option of FIG. 4*c*. If on-line training is desired it is also necessary to change the step-function outputs into smoothed sigmoidal function outputs. That is, instead of the output alternating current signal being gated on or off, its amplitude is made a smooth sigmoidal function of the difference $D_i$ between the signal on line 38 and the threshold 44 $T_i$. This can be done by generating a sigmoidal envelope function by processing the difference signal $D_i$ with a suitable op-amp, and then multiplying the envelope function and the phase reference 52*a,b* in a four-quadrant multiplier, or other suitable modulator circuit. Finally, to avoid committing a priori to either the neuron of Eq. (12) or the complementary neuron with $\theta(x)$ replaced by $\theta(-x)$, it is necessary in on-line training to include an on-line switch which either reverses the polarity of the rectifier, or selects between normal and inverted comparator outputs, or in the sigmoidal output version, between normal and inverted difference signals $D_i$.

In computer simulation of the training of a network constructed from the neurons of Eq. (12), one can simultaneously take account of the two cases consisting of Eq. (12) and its complementary neuron, by the following method: Define rescaled weights, offset value and threshold by $$\hat{w}_{ik} = w_{ik}/w_{11}, \hat{u}_i = \hat{u}_i/w_{11}, \hat{t}_i = t_i/|w_{11}|, \tag{23a}$$

so that Eq. (12) becomes $$v_i^{out} = e^{i\phi_i\theta}\left(\beta \left| \sum_{k=1}^{n} \hat{w}_{ik} v_k^{in} + \hat{u}_i \right| - \hat{t}_i \right), i = 1, \ldots, m, \tag{23b}$$

with $\hat{w}_{11}$ fixed at unity. When the parameter $\beta$ varies from 0 to $+\infty$, Eq. (23b) corresponds to Eq. (12) with $|w_{11}|=\beta$. Similary, when $\beta$ varies from $-\infty$ to 0, Eq. (23b) corresponds to the neuron complementary to Eq. (12), with $|w_{11}|=\beta$ and with a sign reversal in $t_i$. By taking derivatives of Eq. (23b) with respect to the various continuous parameters, including $\beta$, but not including $\hat{w}_{11}$, which is fixed at unity, the back-propagation algorithm can be applied in a computer simulation, to determine the weights for a network based on the neuron of Eq. (12) and its complementary form.

The invention 10 just described has a number of advantages over the prior art in neural networks. Because it can directly compute XOR and because it has no convexity limitation, even at the one-layer level, it has computational capabilities superior to those of the standard Mc Culloch-Pitts neuron. Moreover, it can operate with a non-dissipative capacitive synaptic weight matrix in a steady state mode. With alternative input and output segments, the invention can interpolate between positive and negative weights using an adjustable phase-shifter, and can implement a generalized neuron based on complex number arithmetic. It can reproduce the standard Mc Culloch-Pitts neuron while incorporating a non-dissipative implementation of the neural weights, and can similarly implement the neurons needed for the Hopfield associative memory model and its complex number generalizations. In its most general form, the alternating current architecture can realize an infinite variety of nonlinear neural processing elements, using a standardized form for the neuronal input and output signals which is compatible with capacitive implementation of the synaptic matrices.

While the invention has been described with reference to the preferred embodiment and some alternative embodiments thereof, it will be appreciated by those of ordinary skill in the art that modifications can be made to the structure and elements of the invention without departing from the spirit and scope of the invention as a whole.

I claim:

1. An alternating current (AC) neuron system having a number n, which is greater than 1, of input signal terminal pairs for receiving phase-coherent alternating signal inputs, a first terminal of each input pair receiving a signal of amplitude $v_k^{in}$, and a corresponding second terminal of each input pair receiving a signal of amplitude $\lambda_k^{in} v_k^{in'}$, where k is an index which ranges from 1 to n, wherein $\lambda_k^{in} \geq 0$ is a scale factor of arbitrary magnitude and $v_k^{in'}$ is an amplitude phase displaced with respect to $v_k^{in}$, said system comprising:

a weighting means for giving to said signal of amplitude $v_k^{in}$ a weight $w_{ik}$ respectively for each k, thereby providing a weighted signal;

a summing means for forming an AC sum signal $S_i$ in the form $$\sum_{k=1}^{n} w_{ik} v_k^{in};$$

and, a nonlinear processing means for converting said AC sum signal $S_i$ into a neuron output $v_i^{out}$, said nonlinear processing means including an alternating current (AC) to direct current (DC) processing means for converting said AC sum signal $S_i$ into a DC signal and a threshold means connected to said AC to DC processing means for determining whether said DC signal exceeds a threshold $T_i$, wherein said threshold means produces an output as a function of the difference $D_i$ between said DC signal and said threshold $T_i$.

2. An alternating current (AC) neuron system in accordance with claim 1, wherein:

$v_k^{in'}$ and $v_k^{in}$ are 180 degrees out of phase with each other, so that $v_k^{in'} = -v_k^{in}$.

3. The AC neuron system of claim 2 further comprising:

a source of AC to be gated; and,

AC gate means connected to said threshold means and to said AC source for producing an AC output signal, said output signal consisting of a signal of amplitude $+v_i^{out}$ and a second signal of amplitude $-\lambda_i^{out} v_i^{out}$, wherein $\lambda_i^{out} \geq 0$ is a scale factor of arbitrary magnitude, wherein the AC output signal has the form of $v_i^{out} = \theta(D_i)$, wherein $\theta$ is a function of its argument $D_i$ which is 1, in arbitrary output units, for $D_i$ larger than a positive threshold $t^+$, and where $\theta$ is $-\lambda$, wherein $\lambda \geq 0$ is a scale factor of arbitrary magnitude in the same output units, when $D_i$ is smaller than a negative threshold $-t^-$, and where $\theta$ varies smoothly from $-\lambda$ to 1 as $D_i$ varies from $-t^-$ to $t^+$.

4. The AC neuron system of claim 3, wherein said means for producing an AC output signal further comprises:

phase-shifting means, having an input connected to said source of AC to be gated, and an output connected to said AC gate means, wherein said phase shifting means increments the phase of said output signal $v_i^{out}$ by a constant phase shift.

5. The AC neuron system of claim 4, wherein said phase shifting means further comprises:

a first AC terminal connected directly, and a second AC terminal connected through an inverting op-amp, to said source AC to be gated;

a double-pole double-throw switch connected to said first and second AC terminals in direct order for a first throw and in reversed order for a second throw;

a resistor $R_i$ having a first and second terminal, with said first terminal connected to one pole of said double-pole double-throw switch;

a capacitor $C_i$ having a first and second terminal, with said first terminal of said capacitor connected to the second pole of said double-pole double throw switch; and, with the second terminal of said capacitor $C_i$ connected to the second terminal of said resistor $R_i$, and wherein said common second terminal is connected, as the source of AC to be gated, to said AC gate means.

6. The AC neuron system of claim 2, wherein said weighting means further comprises:

a first capacitor $C_{ik}^+$, and a second capacitor $C_{ik}^-$, said capacitors having a first terminal connected to the respective input terminals receiving signals $+v_k^{in}$ and $-\lambda_k^{in} v_k^{in}$, and their second terminals connected together to form a summing node i, wherein the weight $w_{ik}$ given to the input $v_k^{in}$ is proportional to the difference $C_{ik}^+ - \lambda_k^{in} C_{ik}^-$.

7. The AC neuron system of claim 2, wherein said weighting means further comprises:

phase-shifting and signal dividing means, having an input coupled to said input terminals receiving input signals $+v_k^{in}$ and $-\lambda_k^{in} v_k^{in}$, and an output coupled to said AC to DC processing means, wherein said phase-shifting means increments the phase of the input amplitude $v_k^{in}$ by a constant phase shift.

8. The AC neuron system of claim 7, wherein $\lambda_k{}^{in}=1$ and said phase-shifting and signal dividing means further comprise:

a phase-shifter capacitor $C_{ik}{}^p$ and resistor $R_{ik}{}^p$, and a voltage divider capacitor $C_{ik}$, wherein said input terminals receiving input signals of amplitudes $+v_k{}^{in}$ and $-v_k{}^{in}$ are connected to a first terminal of said capacitor $C_{ik}{}^p$ and resistor $R_{ik}{}^p$ respectively, and the second terminal of capacitor $C_{ik}{}^p$ and resistor $R_{ik}{}^p$ are connected in common together to a first terminal of capacitor $C_{ik}$, with the second terminals of capacitors $C_{ik}$ for the different values of k connected to form a summing node i.

9. The AC neuron system of claim 8 further comprising:

a double pole, double throw switch connected to said input terminals receiving input signals of amplitudes $+v_k{}^{in}$ and $-v_k{}^{in}$, in direct and reversed orders for the two throws, with the two switch poles connected to said capacitor $C_{ik}{}^p$ and resistor $R_{ik}{}^p$.

10. The AC neuron system of claim 2, wherein said AC to DC processing means comprises:

a rectifier receiving as an AC input said sum signal $S_i$; and, filtering means connected to said rectifier and to said threshold means.

11. The AC neuron system of claim 10 further comprising:

a high input impedance follower having an input receiving said sum signal $S_i$, and an output connected to said rectifier, wherein said follower isolates said summing means from said AC to DC processing means.

12. The AC neuron system of claim 10 further comprising:

a high input impedance amplifier having an input receiving said sum signal $S_i$, and an output connected to said rectifier, wherein said amplifier isolates said summing means from said AC to DC processing means, and provides signal amplification with a gain of at least unity as required by said AC to DC processing means.

13. The AC neuron system of claim 10 wherein said threshold means further comprises:

a comparator having a first input, a second input and an output, wherein said first input of said comparator is connected to said filtering means, and said second input of said comparator is connected to said threshold $T_i$.

14. The AC neuron system of claim 10 wherein said AC to DC processing means further comprises:

an offset means for providing an offset $u_i$ to said sum $S_i$, producing a modified sum $S_i+u_i$ which comprises the rectifier input signal.

15. The AC neuron system of claim 14 wherein said weighting means and said offset means further comprise:

a first capacitor $C_{ik}{}^+$ and a second capacitor $C_{ik}{}^-$, said capacitors having a first terminal connected to the respective input signal terminals receiving input signals $+v_k{}^{in}$ and $-\lambda_k{}^{in}v_k{}^{in}$, and their second terminals connected together to form a summing node i;

an AC offset signal means for providing a first signal $+U_i$, and a second signal $-\lambda_i{}^{off}U_i$, wherein $\lambda_i{}^{off} \geq 0$ is a scale factor of arbitrary magnitude; and, a first capacitor $C_{ui}{}^+$, and a second capacitor $C_{ui}{}^-$, said capacitors having a first terminal connected to the respective offset signals $+U_i$ and $-\lambda_i{}^{off}U_i$, and their second terminals connected together to said summing node i, wherein said offset $u_i$ is proportional to $(C_{ui}{}^+ - \lambda_i{}^{off} C_{ui}{}^-)U_i$.

16. The AC neuron system of claim 2, wherein said AC to DC processing means comprises:

a source providing an AC signal of amplitude $u_i$ which is phase-coherent with the signal of amplitude $v_k{}^{in}$;

a heterodyne mixer means having a first and a second input, and a DC-coupled output, said first input of said heterodyne mixer receiving said sum signal $S_i$, and said second input of said heterodyne mixer receiving said AC signal of amplitude $u_i$; and, filtering means connected to the output of said heterodyne mixer and to said threshold means.

17. The AC neuron system of claim 16 further comprising:

a high input impedance follower having an input receiving said sum signal $S_i$, and an output connected to said heterodyne mixer, wherein said follower isolates said summing means from said AC to DC processing means.

18. The AC neuron system of claim 16 further comprising:

a high input impedance amplifier having an input receiving said sum signal $S_i$, and an output connected to said heterodyne mixer, wherein said amplifier isolates said summing means from said AC to DC processing means, and provides signal amplification with a gain of at least unity as required by said AC to DC processing means.

19. The AC neuron system of claim 16 wherein said threshold means further comprises:

a comparator having a first input, a second input and an output, with said first input of said comparator connected to said filtering means, and with said second input of said comparator connected to said threshold $T_i$.

20. An alternating current neuron system as in claim 2, further comprising:

means to split said sum signal $S_i$ into two identical signals $S_{1i}=S_i$ and $S_{2i}=S_i$;

a source of AC signals of amplitudes $u_i$ and $-u_i$ which are phase-coherent with the signal of amplitude $v_k{}^{in}$ received on the first input terminal;

two sets of AC to DC processing means, the first of which processes said signal $S_{1i}$ and said AC signal of amplitude $u_i$ to give a DC output $X_{1i}$, and the second of which processes said signal $S_{2i}$ and said AC signal of amplitude $-u_i$, to give a DC output $X_{2i}$;

comparison means to determine the difference $X_{1i}-X_{2i}$ thereby providing a difference signal $D_i$;

a source of AC to be gated; and,

AC gate means connected to said comparison means and to said AC source for producing an AC output signal, said output signal consisting of a first signal $+v_i{}^{out}$ and a second signal $-\lambda_i{}^{out}v_i{}^{out}$ wherein $\lambda_i{}^{out} \geq 0$ is a scale factor of arbitrary magnitude, wherein the AC output signal has the form of $v_i{}^{out} = \theta(D_i)$, wherein $\theta$ is a function of its argument $D_i$ which is 1, in arbitrary output units, for $D_i$ larger than a positive threshold $t^+$, and where $\theta$ is $-\lambda$, wherein $\lambda \geq 0$ is a scale factor of arbitrary magnitude in the same output units, when $D_i$ is smaller than a negative threshold $-t^-$, and where $\theta$ varies smoothly from $-\lambda$ to 1 as $D_i$ varies from $-t^-$ to $t^+$.

21. An AC neuron system having a number N, which is greater than 1, of input signal terminal pairs for receiving phase-coherent alternating signal inputs, a first terminal of each input pair receiving a signal of amplitude $v_k^{in}$, and a corresponding second terminal of each input pair receiving a signal of amplitude $\lambda_k^{in} v_k^{in'}$, with k an index which ranges from 1 to N, wherein $\lambda_k^{in} \geq 0$ is a scale factor of arbitrary magnitude and $v_k^{in'}$ is an amplitude phase displaced with respect to $v_k^{in}$ said system comprising:

a multiple weighting means for giving to said signal of amplitude $v_k^{in}$ multiple weights $w_{lik}$ respectively for each k, with l ranging from 1 to L, where $2 \leq L \leq N$, thereby providing multiple weighted signals;

a summing means for forming L sum signals $S_{li}$ in the form $$\sum_{k=1}^{N} w_{lik} v_k^{in};$$

and, a nonlinear processing means for converting said L sum signals $S_{li}$ into a neuron output $v_l^{out}$ including an AC source providing a set of phase-coherent AC output reference signals $r_m$, with m ranging from 1 to M, with M at least 1, wherein said nonlinear processor means is connected to said AC source to produce an AC output signal $v_l^{out}$ as a nonlinear function of said L sum signals $S_{li}$ and said reference signals $r_m$.

22. An AC neuron system in accordance with claim 21, wherein:

$v_k^{in'}$ and $v_k^{in}$ are 180 degrees out of phase with each other, so that $v_k^{in'} = -v_k^{in}$.

23. An alternating current (AC) neuron system having a number n, which is greater than 1, of input signal terminal pairs for receiving phase-coherent alternating signal inputs, a first terminal of each input pair receiving a signal of amplitude $v_k^{in}$, and a corresponding second terminal of each input pair receiving a signal of amplitude $\lambda_k^{in} v_k^{in'}$, where k is an index which ranges from 1 to n, wherein $\lambda_k^{in} \geq 0$ is a scale factor of arbitrary magnitude and $v_k^{in'}$ is an amplitude phase displaced with respect to $v_k^{in}$, said system comprising:

a weighting means for giving to said signal of amplitude $v_k^{in}$ a weight $w_{ik}$ respectively for each k, thereby providing a weighted signal, said weighting means including a first capacitor $C_{ik}$, and a second capacitor $C'_{ik}$, said capacitors having a first terminal connected to the respective input terminal receiving said signals of amplitude $v_k^{in}$ and $\lambda_k^{in} v_k^{in'}$, and their second terminals connected together to form a summing node i, wherein said weight $w_{ik}$ is proportional to the combination $C_{ik} + \lambda_k^{in}(v_k^{in'}/v_k^{in}) C'_{ik}$;

a summing means for forming an AC sum signal $S_i$ in the form $$\sum_{k=1}^{n} w_{ik} v_k^{in};$$

and, a nonlinear processing means for converting said sum signal $S_i$ into a neuron output $v_i^{out}$.

24. An alternating current (AC) neuron system in accordance with claim 23, wherein:

$v_k^{in'}$ and $v_k^{in}$ are 180 degrees out of phase with each other, so that $v_k^{in'} = -v_k^{in}$.

25. An AC neuron system having a number N, which is greater than 1, of input signal terminal pairs for receiving phase-coherent alternating signal inputs, a first terminal of each input pair receiving a signal of amplitude $v_k^{in}$, and a corresponding second terminal of each input pair receiving a signal of amplitude $\lambda_k^{in} v_k^{in'}$, with k an index which ranges from 1 to N, wherein $\lambda_k^{in} \geq 0$ is a scale factor of arbitrary magnitude and $v_k^{in'}$ is an amplitude phase displaced with respect to $v_k^{in}$, said system comprising:

a multiple weighting means for giving to said signal of amplitude $v_k^{in}$ multiple weights $w_{lik}$ respectively for each k, with l ranging from 1 to L, where $2 \leq L \leq N$, thereby providing multiple weighted signals, wherein said multiple weighting means includes a first capacitor $C_{lik}$, and a second capacitor $C'_{lik}$, said capacitors having a first terminal connected to the respective input terminal receiving said signals of amplitude $v_k^{in}$ and $\lambda_k^{in} v_k^{in'}$, and their second terminals connected together to form a summing node li, wherein said multiple weight $w_{lik}$ is proportional to the combination $C_{lik} + \lambda_k^{in}(-v_k^{in'}/v_k^{in}) C'_{lik}$;

a summing means for forming L sum signals $S_{li}$ in the form $$\sum_{k=1}^{N} w_{lik} v_k^{in};$$

and, a nonlinear processing means for converting said L sum signals $S_{li}$ into a neuron output $v_l^{out}$.

26. An AC neuron system in accordance with claim 25, wherein:

$v_k^{in'}$ and $v_k^{in}$ are 180 degrees out of phase with each other, so that $v_k^{in'} = -v_k^{in}$.

27. An alternating current (AC) neuron system having a number n, which is greater than 1, of input signal terminal pairs for receiving phase-coherent alternating signal inputs, a first terminal of each input pair receiving a signal of amplitude $v_k^{in}$, and a corresponding second terminal of each input pair receiving a signal of amplitude $\lambda_k^{in} v_k^{in'}$, where k is an index which ranges from 1 to n, wherein $\lambda_k^{in} \geq 0$ is a scale factor of arbitrary magnitude and $v_k^{in'}$ is an amplitude phase displaced with respect to $v_k^{in}$, said system comprising:

a weighting means for giving to said signal of amplitude $v_k^{in}$ a weight $w_{ik}$ respectively for each k, thereby providing a weighted signal, wherein for at least two of the signals of amplitude $v_k^{in}$ said weighting means includes a voltage divider including a capacitance coupled to one of the terminals of the input signal terminal pair for said signal of amplitude $v_k^{in}$;

a summing means for forming an AC sum signal $S_i$ in the form $$\sum_{k=1}^{n} w_{ik} v_k^{in};$$

and, a nonlinear processing means for converting said AC sum signal $S_i$ into a neuron output $v_i^{out}$.

28. An alternating current (AC) neuron system in accordance with claim 27, wherein:

$v_k^{in'}$ and $v_k^{in}$ are 180 degrees out of phase with each other, so that $v_k^{in'} = -v_k^{in}$.

29. An AC neuron system having a number N, which is greater than 1, of input signal terminal pairs for receiving phase-coherent alternating signal inputs, a first terminal of each input pair receiving a signal of amplitude $v_k^{in}$, and a corresponding second terminal of each input pair receiving a signal of amplitude $\lambda_k^{in} v_k^{in'}$, where k is an index which ranges from 1 to N, wherein $\lambda_k^{in} \geq 0$ is a scale factor of arbitrary magnitude and $v_k^{in'}$ is an amplitude phase displaced with respect to $v_k^{in}$, said system comprising:

a multiple weighting means for giving to said signal of amplitude $v_k^{in}$ multiple weights $w_{lik}$ respectively for each k, with l ranging from 1 to L, where $2 \leq L \leq N$, thereby providing multiple weighted signals, wherein for at least two of the signals of amplitude $v_k^{in}$ said multiple weighting means includes a voltage divider including a capacitance coupled to one of the terminals of the input signal terminal pair for said signal of amplitude $v_k^{in}$;

a summing means for forming L sum signals $S_{li}$ in the form $$\sum_{k=1}^{N} w_{lik} v_k^{in};$$

and, a nonlinear processing means for converting said L sum signals $S_{li}$ into a neuron output $v_i^{out}$.

30. An AC neuron system in accordance with claim 29, wherein:

$v_k^{in'}$ and $v_k^{in}$ are 180 degrees out of phase with each other, so that $v_k^{in'} = -v_k^{in}$.

31. An AC neuron system having a number n, which is greater than 1, of input signal terminal groups, each group containing a plurality of terminals, for receiving phase-coherent alternating signal inputs, a first terminal of each input group receiving a signal of amplitude $v_k^{in}$, with k an index which ranges from 1 to n, and with each further terminal t of aforesaid input group receiving a signal of amplitude $\lambda_{k,t}^{in} v_{k,t}^{in}$, wherein $\lambda_{k,t}^{in} \geq 0$ is a scale factor of arbitrary magnitude and $v_{k,t}^{in}$ is an amplitude phase displaced with respect to $v_k^{in}$, said system comprising:

a weighting means for giving to said signal of amplitude $v_k^{in}$ a weight $w_{ik}$ respectively for each k, thereby providing a weighted signal, wherein for at least two of the signals of amplitude $v_k^{in}$ said weighting means includes a voltage divider including a capacitance coupled to one of the terminals of the input signal terminal group for said signal of amplitude $v_k^{in}$;

a summing means for forming an AC sum signal $S_i$ in the form $$\sum_{k=1}^{n} w_{ik} v_k^{in};$$

and, a nonlinear processing means for converting said AC sum signal $S_i$ into a neuron output $v_i^{out}$.

32. An AC neuron system having a number N, which is greater than 1, of input signal terminal groups, each group containing a plurality of terminals, for receiving phase-coherent alternating signal inputs, a first terminal of each input group receiving a signal of amplitude $v_k^{in}$, with k an index which ranges from 1 to N, and with each further terminal t of aforesaid input group receiving a signal of amplitude $\lambda_{k,t}^{in} v_{k,t}^{in}$, wherein $\lambda_{k,t}^{in} \geq 0$ is a scale factor of arbitrary magnitude and $v_{k,t}^{in}$ is an amplitude phase displaced with respect to $v_k^{in}$, said system comprising:

a multiple weighting means for giving to said signal of amplitude $v_k^{in}$ multiple weights $w_{lik}$ respectively for each k, with l ranging from 1 to L, where $2 \leq L \leq N$, thereby providing multiple weighted signals, wherein for at least two of the signals of amplitude $v_k^{in}$ said multiple weighting means includes a voltage divider including a capacitance coupled to one of the terminals of the input signal terminal group for said signal of amplitude $v_k^{in}$;

a summing means for forming L sum signals $S_{li}$ in the form $$\sum_{k=1}^{N} w_{lik} v_k^{in};$$

and, a nonlinear processing means for converting said L sum signals $S_{li}$ into a neuron output $v_i^{out}$.

* * * * *